(12) United States Patent
Tanaka et al.

(10) Patent No.: US 6,438,474 B1
(45) Date of Patent: Aug. 20, 2002

(54) APPARATUS FOR CONTROLLING BEHAVIOR OF VEHICLE

(75) Inventors: Hirohisa Tanaka; Yoshio Katayama; Kazuhiro Kato, all of Itami; Yoshihiro Watanabe, Hiroshima, all of (JP)

(73) Assignees: Sumitomo Electric Industries, Ltd., Osaka; Mazda Motor Corporation, Hiroshima, both of (JP)

(*) Notice: Subject to any disclaimer, the term of this patent is extended or adjusted under 35 U.S.C. 154(b) by 0 days.

(21) Appl. No.: 09/671,450

(22) Filed: Sep. 27, 2000

(30) Foreign Application Priority Data

Sep. 28, 1999 (JP) ............................................ 11-274335

(51) Int. Cl.⁷ .............................. G06F 7/00; G05D 1/00
(52) U.S. Cl. ............................. 701/41; 701/70; 701/72; 303/140
(58) Field of Search ................................ 701/1, 37, 41, 701/70, 72, 81, 89; 303/140, 143, 146; 180/197

(56) References Cited

U.S. PATENT DOCUMENTS

| 4,941,097 | A | * | 7/1990 | Karnopp et al. ............... 701/41 |
| 5,261,503 | A | * | 11/1993 | Yasui ............................ 180/422 |
| 5,313,389 | A | * | 5/1994 | Yasui ............................ 701/43 |
| 5,402,342 | A | | 3/1995 | Ehret et al. |
| 5,700,073 | A | * | 12/1997 | Hiwatashi et al. ............. 303/146 |
| 5,742,917 | A | | 4/1998 | Matsumo |
| 5,893,896 | A | * | 4/1999 | Imamura et al. ............... 701/70 |
| 5,915,800 | A | * | 6/1999 | Hiwarashi et al. ............. 303/146 |
| 6,074,020 | A | * | 6/2000 | Takahashi et al. ............. 303/146 |
| 6,092,882 | A | * | 7/2000 | Matsuno ........................ 303/146 |
| 6,094,614 | A | * | 7/2000 | Hiwatashi ...................... 701/89 |
| 6,155,655 | A | * | 12/2000 | Matsuno ........................ 303/140 |
| 6,199,001 | B1 | * | 3/2001 | Ohta et al. ..................... 701/51 |

FOREIGN PATENT DOCUMENTS

| DE | 196 28 485 | 1/1997 |
| DE | 198 13 736 | 10/1998 |
| JP | 03-135865 | 6/1991 |
| JP | 07-223520 | 8/1995 |

* cited by examiner

Primary Examiner—Gertrude Arthur
(74) Attorney, Agent, or Firm—Nixon Peabody LLP; Donald R. Studebaker

(57) ABSTRACT

An ECU (2) of a vehicle executes under-steering control when a steering wheel is operated in the direction to increase the steering angle under an under-steering state and the yaw rate does not increase. The under-steering control is not executed under such a driven under-steering state that the vehicle is cornering while applying the engine power to the driven wheels. The under-steering control is executed only under such a condition that although the steering wheel is operated in the direction to increase the steering angle, the actual yaw rate $\phi$ does not change and not follow the operation. Thus, in the vehicle, when the under-steering control for restraining the under-steering state or the over-steering control for restraining the over-steering state is executed during the cornering motion of the vehicle, the condition for executing the under-steering control or the over-steering control is adequately set. In consequence, it is prevented that the driver feels a malaise due to the excessively earlier or later execution of the control so that both of higher safety and driving characteristics may be obtained.

10 Claims, 14 Drawing Sheets

APPARATUS FOR CONTROLLING BEHAVIOR OF VEHICLE

BACKGROUND OF THE INVENTION

1. Field of the Invention

The present invention relates to an apparatus for controlling behavior of a vehicle, more particularly, to the apparatus for controlling behavior of the vehicle during its cornering motion so as to avoid its drift-out due to its under-steering state or its spin due to its over-steering state.

2. Prior Art

An apparatus for controlling behavior of a vehicle is conventionally well known, for example, as described in the Japanese Laid-open Patent Publication No.6-183288 or No.7-223520. In the apparatus, a target yaw rate is set on the basis of a steering angle and speed of the vehicle while an actual yaw rate of the vehicle is detected using a yaw rate sensor. When deviation between the detected actual yaw rate and the target yaw rate is larger than or equal to a preset value, under-steering control for restraining an under-steering state of the vehicle or over-steering control for restraining an over-steering state of the vehicle is executed (interposed) in the vehicle controlling process.

To be concrete, the under-steering control is executed when the target yaw rate is larger than a threshold, which is such a value that a preset value is added to the actual yaw rate. On the other hand, the over-steering control is executed when the actual yaw rate is larger than a threshold, which is such a value that a preset value is subtracted from the target yaw rate.

In the conventional apparatus described above, however, there is a tendency that the under-steering control is executed excessively and frequently when the target yaw rate is larger than the threshold which is the sum of the preset value and the actual yaw rate. For example, even if the under-steering state of the vehicle falls under a so-called driven under-steering state which is caused when the is vehicle is cornering while applying the driving force of the engine to the driven wheels in accordance with the driver's operation, it may be judged that it is running under the under-steering state resulting in the drift-out of the vehicle. In consequence, the under-steering control may be executed. In that case, the under-steering control interferes with the driven under-steering state according to the driver's intention. In consequence, the driven under-steering state according to the driver's intention cannot be efficiently obtained so that the driver may feel a malaise.

If the threshold for performing the under-steering control is set to a larger value, it may be prevented that the under-steering control is executed too early so that the driven under-steering state according to the driver's intention may be obtained. In that case, however, the under-steering control may be executed too late. In consequence, it may be difficult to rapidly restrain the under-steering state resulting in the drift-out of the vehicle. So it may be unavoidable to cause the driver's malaise due to the delay of the under-steering control.

On the other hand, when the over-steering control for restraining the over-steering state of the vehicle is executed, the following problem may occur. That is, for example, if the vehicle is one of a front wheel driving type and the engine power is lowered to cause a so-called tack-in state when the steering wheel is turned beyond a preset angle, or if there occurs a so-called counter-steering state in which the driver consciously turns back the steering wheel in the direction opposite to the vehicle-turning direction in order to restrain the over-steering state of the vehicle, it may be difficult to execute the over-steering control for restraining the tack-in state or the counter-steering state.

SUMMARY OF THE INVENTION

The present invention has been achieved in view of the above-mentioned various problems and has an object to provide a vehicle having both of higher safety and higher driving characteristics by improving the condition for executing the under-steering or over-steering control to make the control proper, thereby preventing the driver's malaise resulting from executing the control too early or too late.

According to the first aspect of the present invention which is performed to achieve the above-mentioned object, under-steering control is executed when there has been accomplished such a condition that the steering wheel is operated in the direction to increase the steering angle and the yaw rate does not increase.

To be concrete, an apparatus for controlling behavior of a vehicle according to the first aspect of the present invention includes a controller which controls behavior of a yaw rate of the vehicle by estimating a running state of the vehicle to control a brake on the basis of estimated results. The controller executes under-steering control for restraining an under-steering state when a steering wheel is operated in a direction to increase a steering angle and the yaw rate does not increase in such a condition that the vehicle is in the under-steering state.

The condition that the steering wheel is operated in the direction to increase the steering angle and the yaw rate does not increase when the vehicle is in the under-steering state, is accomplished in the following case. That is, it is such a case that although the driver is operating the steering wheel in the direction to increase the steering angle in order to restrain the under-steering state of the vehicle, the actual yaw rate does not follow the operation, namely does not change. Therefore the apparatus may conclude that the vehicle causes a drift-out if the under-steering control is not executed. In consequence, the apparatus executes the under-steering control so that the under-steering state may be restrained.

On the other hand, under other conditions, for example such a condition that the driver is not operating the is steering wheel in the direction to increase the steering angle when the vehicle is in the under-steering state, it may be judged that the vehicle is in such driven under-steering state that the vehicle is cornering while applying the engine power to the driven wheels. In consequence, even if the vehicle is in the under-steering state, the control for restraining the state may not be executed. Therefore the under-steering control can be executed only in such a case that it is required actually and really. Thus the under-steering control may be adequately executed so that the vehicle may have both of higher safety and higher driving characteristics.

An apparatus for controlling behavior of a vehicle according to the second aspect of the present invention includes a controller which sets a target yaw rate on the basis of lateral acceleration and speed of the vehicle, and makes an actual yaw rate follow the target yaw rate. Hereupon, the controller quickens (preferentially) executing under-steering control for restraining an under-steering state of the vehicle than usual if the target yaw rate lowers by a preset value or more on an occasion that the vehicle is cornering.

That is, when the target yaw rate, which is set on the basis of the lateral acceleration and speed of the vehicle on the occasion that it is cornering, lowers by the preset value or more, it may be judged, for example, that the friction factor of the road surface rapidly changes so that the lateral acceleration decreases. In consequence, the period for executing the under-steering control is quickened. In this case also, the under-steering control may be adequately executed. In consequence, it may be prevented that the under-steering control is unnecessarily executed so that the vehicle may have both of higher safety and higher driving characteristics.

According to the third aspect of the present invention, in the apparatus for controlling the behavior of the vehicle according to the first aspect, the controller executes the under-steering control when a target yaw rate, which is set on the basis of a lateral acceleration and speed of the vehicle, lowers by a preset value or more on an occasion that the vehicle is cornering. In this case, if the steering wheel is not operated when it is judged that the friction factor of the road surface rapidly changes so that the lateral acceleration decreases, the under-steering control may be forcibly executed as same as the case of the second aspect. In consequence, the condition for executing the under-steering control may be held adequately.

An apparatus for controlling behavior of a vehicle having driven front wheels according to the fourth aspect of the present invention includes a controller which sets a target yaw rate by using at least speed of the vehicle, and makes an actual yaw rate follow the target yaw rate. Hereupon, the controller quickens executing over-steering control for restraining an over-steering state of the vehicle than usual if the vehicle is judged to be in a tack-in state.

In the apparatus having the above-mentioned construction, the period for executing the over-steering control is quickened when the vehicle of the front wheel drive type is judged to be in the tack-in state. In consequence, spin of the vehicle due to the tack-in state may be restrained at the early stage so that the condition for executing the over-steering control may be held adequately.

According to the fifth aspect of the present invention, in the apparatus for controlling the behavior of the vehicle according to the fourth aspect, the controller quickens executing the over-steering control by lowering a threshold (starting threshold) for executing the over-steering control. In this case, the over-steering control may be easily executed on the occasion of the tack-in state. Meanwhile, in the apparatus according to the sixth aspect of the present invention, the controller quickens executing the over-steering control by executing the over-steering control by force. In this case, the over-steering control may be forcibly executed on the occasion of the tack-in state. In each of the fifth and sixth aspects, the condition for executing the over-steering control on the occasion of the tack-in state may be embodied.

An apparatus for controlling behavior of a vehicle according to the seventh aspect of the present invention includes a controller which sets a target yaw rate by using at least speed of the vehicle, and makes an actual yaw rate follow the target yaw rate. Hereupon, the controller quickens executing over-steering control for restraining an over-steering state of the vehicle than usual if the vehicle is judged to be in a counter-steering state.

In the apparatus, the period for performing the over-steering control is quickened when the vehicle is judged to be in the counter-steering state. In consequence, spin of the vehicle due to the counter-steering state may be restrained at the early stage so that the condition for executing the over-steering control may be held adequately.

According to the eighth aspect of the present invention, in the apparatus for controlling the behavior of the vehicle according to the seventh aspect, the controller quickens executing the over-steering control by lowering a threshold (starting threshold) for performing the over-steering control. In this case, the over-steering control may be easily executed on the occasion of the counter-steering state. Meanwhile, in the apparatus according to the ninth aspect of the present invention, the controller quickens executing the over-steering control by executing the over-steering control by force. In this case, the over-steering control may be forcibly executed on the occasion of the counter-steering state. In each of the eighth and ninth aspects, the condition for executing the over-steering control on the occasion of the counter-steering state may be embodied.

According to the tenth aspect of the present invention, in the apparatus for controlling the behavior of the vehicle according to the seventh aspect, the controller sets the target yaw rate on the basis of lateral acceleration and speed of the vehicle, and judges the counter-steering state on the basis of a steering angle of the vehicle. In this case, the counter-steering state of the vehicle can be judged quickly and easily on the basis of the steering angle so that the period for executing the over-steering control on the occasion of the counter-steering state may be quickened.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Figure 1:
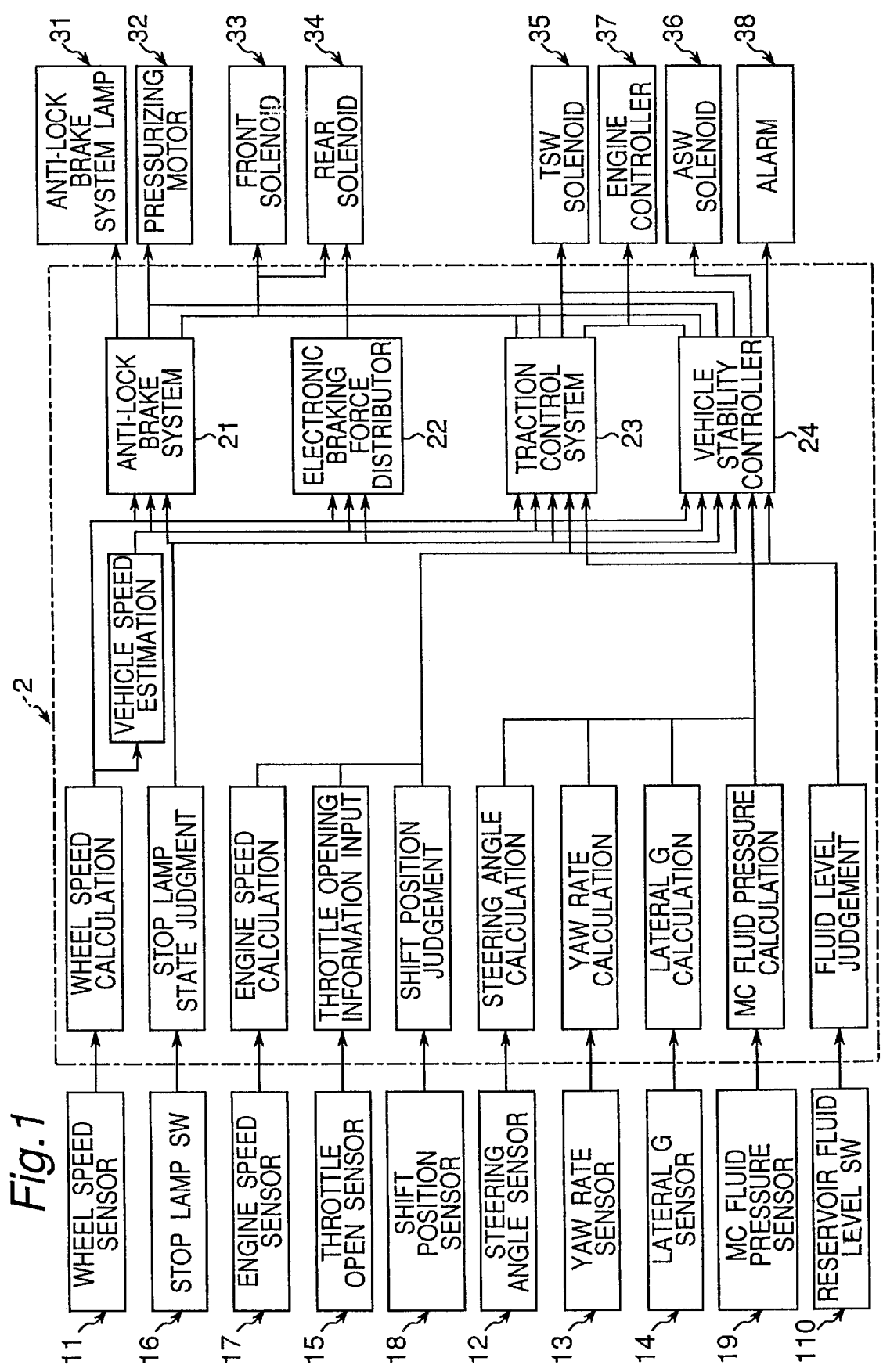
FIG. 1 is a block diagram showing an apparatus for controlling behavior of a vehicle according to the present invention.

FIG. 1 shows an overall construction of a behavior controller of a vehicle according to an embodiment of the present invention. At first, each of devices disposed at the input side of the controller will be described. The numeral 11 denotes a wheel speed sensor for detecting wheel speed of each of wheels. The numeral 12 denotes a steering angle sensor for detecting a steering angle of a steering wheel. The numeral 13 denotes a yaw rate sensor for detecting a yaw rate caused in the vehicle. The numeral 14 denotes a lateral acceleration sensor (lateral G sensor) for detecting acceleration in the lateral direction of the vehicle. The numeral 15 denotes a throttle open sensor for detecting throttle opening. The numeral 16 denotes a stop lamp switch for canceling control of an anti-lock brake system 21 which will be described later. The numeral 17 denotes an engine speed sensor for detecting engine speed, which detects the engine speed in order to perform feedback control of engine power. The numeral 18 denotes a shift position sensor (AT) for detecting the shift position in order to detect the driving state of the engine (power train). The shift position sensor 18 is also used as a cancel switch for canceling the behavior control on the occasion of the reverse condition. The numeral 19 denotes an MC fluid pressure sensor for detecting fluid pressure of a master cylinder (MC) which is a first fluid pressure source. The brake fluid pressure is corrected so as to change to the fluid pressure corresponding to the brake pedal operating force of the driver, in accordance with the result detected by the MC fluid pressure sensor 19. In addition, the numeral 110 denotes a reservoir fluid level switch for detecting whether the brake fluid exists in the reservoir or not.

Next, each of devices disposed at the output side of the controller will be described. The numeral 31 denotes an anti-lock brake system lamp for warning such a state that the anti-lock brake system 21 is acting. The numeral 32 denotes a pressurizing motor which acts as a means for pressurizing/depressurizing the fluid, the motor being provided on a pressurizing pump which acts as a second fluid pressure source. The numerals 33 and 34 denote a front solenoid valve and a rear solenoid valve, respectively, each of which acts as a pressurizing/depressurizing means for supplying or discharging the brake fluid to or from a brake system such as a disk brake provided for each of the front wheels and the rear wheels. The numeral 35 denotes a TSW solenoid valve which acts as a pressurizing/depressurizing means for shutting or opening the passage between the master cylinder and the brake system for the wheels. The numeral 36 denotes an ASW solenoid valve which acts as a pressurizing/depressurizing means for shutting or opening the passage between the master cylinder and the pressurizing pump. The numeral 37 denotes an engine controller for controlling the output power of the engine (engine output). The numeral 38 denotes an alarm which acts as a warning means for warning the driver that the behavior control of the vehicle is being performed, using sound or display.

Further, there will be described an ECU 2 which acts as a controlling means, to which signals of the sensors and switches 11–19 and 110 disposed at the input side are inputted, while outputting control signals to the devices 31–38 disposed at the output side.

The ECU 2 is provided with the anti-lock brake system 21 which controls braking force to restrain the lock of the wheels when the wheels tend to lock in relation to the road surface. The ECU 2 is further provided with an electronic braking force distributor 22 for distributing the braking force applied to the rear wheels so as to prevent the lock of the rear wheels on the occasion of the braking action. The ECU 2 is also provided with a traction control system 23 for restraining such a phenomenon that the wheels slip in relation to the road surface, by controlling the driving force or braking force for the wheels when the vehicle is running. In addition, the ECU is provided with a vehicle stability controller 24 for restraining or preventing the yaw rate behavior, for example, such as drift-out or spin.

Next, there will be described signals, which are inputted to or outputted from the above-mentioned devices. The signal outputted from the wheel speed sensor 11 is inputted to a wheel speed calculation section and further vehicle speed estimation section, where wheel speed and estimated vehicle speed are calculated on the basis of the signal. Meanwhile, the signal outputted from the stop lamp switch 16 is inputted to the stop lamp state judgement section, and then to each of the anti-lock brake system 21, the electronic braking force distributor 22, the traction control system 23 and the vehicle stability controller 24.

Meanwhile, signals outputted from the engine speed sensor 17, the throttle open sensor 15 and the shift position sensor 18 are inputted to an engine speed calculation section, a throttle opening information input section and a shift position judgement section, respectively. Then, the signals are inputted to the traction control system 23 and the vehicle stability controller 24.

Moreover, the signals outputted from the steering angle sensor 12, the yaw rate sensor 13, the lateral G sensor 14 and the MC fluid pressure sensor 19 are inputted to a steering angle calculation section, a yaw rate calculation section, a lateral G calculation section and an MC fluid pressure calculation section, respectively, where the steering angle, the yaw rate, the lateral acceleration and the MC fluid pressure are calculated on the basis of the above-mentioned signals, respectively, so as to be inputted to the vehicle stability controller 24.

In addition, the signal outputted from the reservoir fluid level switch 110 is inputted to the traction control system 23 and the vehicle stability controller 24 through a fluid level judgement section.

Thus, the anti-lock brake system 21 calculates control variables on the basis of the signals, and then outputs the variables to the anti-lock brake system lamp 31, the pressurizing motor 32, the front solenoid valve 33 and the rear solenoid valve 34 so as to control them. Further, the electronic braking force distributor 22 also controls the rear solenoid valve 34.

The traction control system 23 outputs the signal to the front solenoid valve 33, the rear solenoid valve 34, the pressurizing motor 32, the TSW solenoid valve 35 and the engine controller 37 so as to control them.

Further, the vehicle stability controller 24 outputs the signal to the engine controller 37, the front and rear solenoid valves 33 and 34, the pressurizing motor 32, the TSW and ASW solenoid valves 35 and 36, and the alarm 38 so as to control them.

(Vehicle Stability Control)

Hereinafter, the vehicle stability control (behavior control) by the vehicle stability controller 24 will be described. The vehicle stability controller 24 executes under-steering control such as, for example, control for avoiding drift-out, and over-steering control such as, for example, control for avoiding spin. To be concrete, in the under-steering control, when the control target yaw rate Trϕ is larger than the actual yaw rate ϕ, braking force is applied to the front wheel lying at the inner position under the cornering motion (hereinafter referred to "inner front wheel") or the rear wheel lying at the inner position under the cornering motion (hereinafter referred to "inner rear wheel") while engine power is lowered. According to the under-steering control, centrifugal force of the vehicle is lowered due to decrease of the vehicle speed while moment of the vehicle is caused due to imbalance of the braking force applied to the wheels. In consequence, drift-out may be avoided.

On the other hand, to be concrete, in the over-steering control, when the control target yaw rate Trϕ is smaller than the actual yaw rate ϕ, braking force is applied to the outer front wheel. According to the over-steering control, there may be caused such moment that the front portion of the vehicle is directed toward the outer direction during the cornering motion so that the spin may be avoided.

Figure 2:
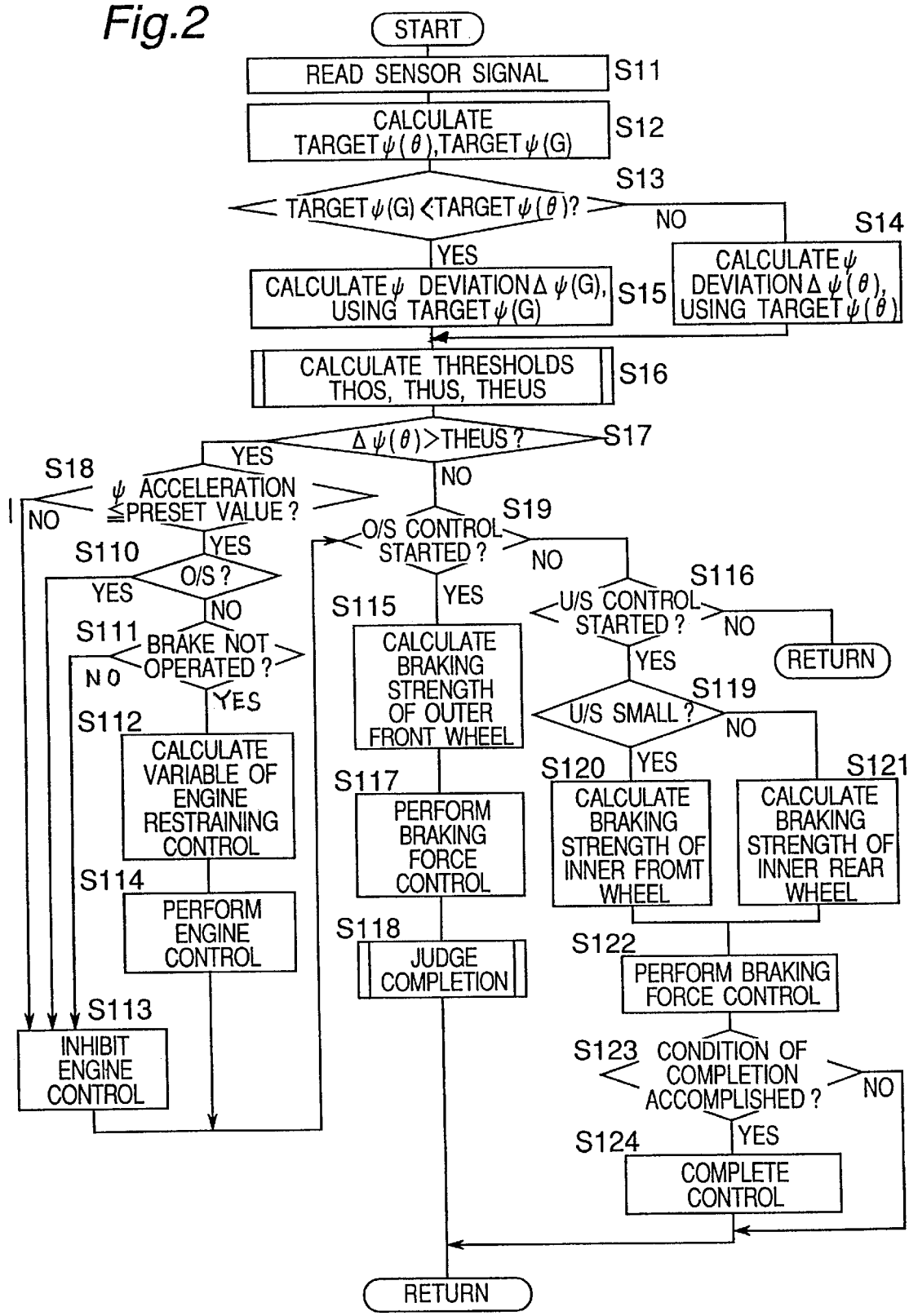
FIG. 2 is a flowchart showing a process of behavior control.

Hereinafter, the behavior control by the vehicle stability controller 24 will be described more particularly in accordance with the flowchart shown in FIG. 2. At first, in Step S11, the signals outputted from the various sensors etc. 11–19 and 110 are read.

Following that, in Step S12, the first target yaw rate ϕ(θ) based on the steering angle and the second target yaw rate ϕ(G) based on the lateral acceleration are calculated.

To be concrete, the first target yaw rate ϕ(θ) is calculated by means of the following expression (1) using the estimated vehicle speed V calculated on the basis of the signal from the wheel speed sensor 11 by the vehicle speed estimation section, and further using the steering angle θ detected by the steering angle sensor 12 and calculated by the steering angle calculation section.

$$\phi(\theta)=V\times\theta/\{(1+K\times V^2)\times L\} \quad (1)$$

Hereupon, K denotes a stability factor. This K is a constant obtained on the occasion of cornering on the road with high μ (friction factor). Further, L denotes a wheel base.

On the other hand, the second target yaw rate of ϕ(G) is calculated by means of the following expression (2) using the estimated vehicle speed V, and the lateral acceleration Gy calculated on the basis of the signal from the lateral G sensor 14 by the lateral G calculation section.

$$\phi(G)=Gy/V \quad (2)$$

Then, in Step S13, it is judged whether the absolute value of the second target yaw rate ϕ(G) is smaller than the absolute value of the first target yaw rate ϕ(θ) or not. That is, in this judging step, it is judged that which of the first and second target yaw rates ϕ(θ) and ϕ(G) should be used (or set) as the control target yaw rate Trϕ. Thus, in the first and second target yaw rates ϕ(θ) and ϕ(G), one whose absolute value is smaller than that of the other, is used as the control target yaw rate Trϕ. Then the behavior control of the vehicle is executed using the control target yaw rate Trϕ.

If the judgement in Step S13 is NO, the process of the control is advanced to Step S14. On the other hand, if it is YES, the control is advanced to Step S15.

In Step S14, the first target yaw rate ϕ(θ) is used as the control target yaw rate Trϕ. Then the deviation Δϕ(θ) between the control target yaw rate Trϕ and the actual yaw rate ϕ which is detected by the yaw rate sensor 13 and calculated by the yaw rate calculation section, is calculated.

On the other hand, in Step S15, the second target yaw rate ϕ(G) is used as the control target yaw rate Trϕ. On that occasion, the control target yaw rate Trϕ is corrected in consideration of the steering angle component using the following expression (3).

$$Tr\phi=\phi(G)+A\times k1 \quad (3)$$

Hereupon, A means (ϕ(θ)−ϕ(G)). Further, k1 is a variable. Then the deviation Δϕ(G) between the corrected control target yaw rate Trϕ and the actual yaw rate ϕ is calculated.

If the correction based on the steering angle component is performed as described above when the second target yaw rate ϕ(G) based on the lateral acceleration is used as the control target yaw rate Trϕ, it may be restrained that the behavior control is executed when the driver intentionally makes the vehicle be under the under-steering state (driven under-steering state).

That is, for example, regarding the under-steering state, there exist two kinds of states. One is such a driven under-steering state that the driver intentionally increases the driving force while holding the steering angle constant. The other is such an unintentional under-steering state that the behavior of the vehicle does not follow the steering operation of the driver. For example, if the second target yaw rate ϕ(G) based on the lateral acceleration is used as the control target yaw rate Trϕ, the lateral acceleration of the vehicle is identical to each other in the above-mentioned two kinds of under-steering states. In consequence, the behavior control may be executed even if the vehicle is under the driven under-steering state. In the control according to the present embodiment, however, the behavior control is executed only on the occasion that the driver is operating the steering wheel so as to increase the steering angle, because the steering angle component is corrected when the second target yaw rate ϕ(G) is used as the control target yaw rate Trϕ. In consequence, the behavior control may be executed only on the occasion that the vehicle is under the unintentional under-steering state, without executing the behavior control on the occasion of the driven under-steering state.

Figure 3:
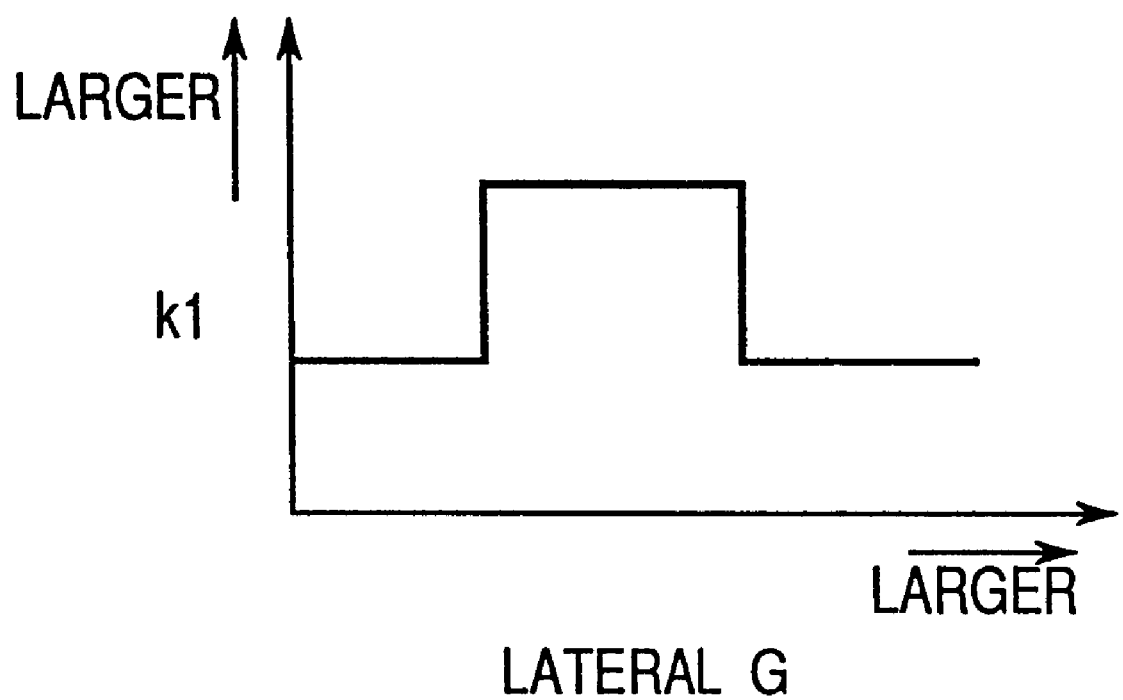
FIG. 3 is a diagram showing a changing characteristic of a correction factor to lateral acceleration.

The value of k1 in the expression (3) has such a characteristic as to change in accordance with the lateral acceleration, for example, as shown in FIG. 3. That is, when the lateral acceleration is much smaller (running on a road surface of lower μ, such as a iced road surface etc.) or much larger (running on a road surface of higher μ), k1 is set to a smaller value so as to decrease the degree of the correction of the steering angle component.

The reason why k1 is set so, is as follows. That is, if k1 is set to a larger value when running in the region of lower μ, the following disadvantage may occur. The driver usually operates the steering wheel so as to make the steering angle become relatively larger in the region of lower μ because the steering response is dull. If k1 is set to a larger value in the above-mentioned case so as to increase the degree of the correction of the steering angle component, the deviation between the control target yaw rate Trϕ and the actual yaw rate ϕ becomes larger so that the control variable of the behavior control, for example braking degree, becomes larger. In consequence, the behavior of the vehicle after completing (or finishing) the behavior control becomes larger in the opposite direction to excess, and then it may be difficult to correct the behavior of the opposite direction.

Meanwhile, the reason why k1 is set to a smaller value in the region of higher μ, is as follows. That is, for example, in the region of higher μ, each of the tires has sufficient grip force. Therefore, if k1 is set to a larger value to increase the steering angle component, the behavior control starts too earlier. That is, in the region of higher μ, the control can be adequately achieved even if the degree of the correction of the steering angle component is not so larger. So k1 is set to a smaller value in the region of higher μ.

Meanwhile, in such a case that the lateral acceleration is medium (running in a region of medium μ), which corresponds to such a state that the vehicle is running on the road surface such as pressed snow, the probability that the vehicle slips in the lateral direction may be larger. Therefore k1 is set to a larger value to raise the degree of the correction of the steering angle component so that the behavior control is executed earlier.

The behavior control may be executed at an adequate time point by changing the value of k1 in accordance with the lateral acceleration as described above.

If the deviation $\Delta\phi(\theta)$ or $\Delta\phi(G)$ between the control target yaw rate Trφ and the actual yaw rate φ has been calculated in Step S14 or S15, the process is advanced to Step S16. In Step S16, there are set a threshold (THOS) for judging whether the over-steering control should be executed or not, another threshold (THEUS) for judging whether the engine control in the under-steering control should be executed or not, and a further threshold (THUS) for judging whether the brake control in the under-steering state should be executed or not. Hereupon, it is set that THUS is larger than THEUS (THUS>THEUS).

Next, in Step S17, it is judged whether THEUS is larger than the deviation $\Delta\phi(\theta)$ between the first target yaw rate $\phi(\theta)$ and the actual yaw rate φ or not. That is, it is judged whether the engine control in the under-steering state should be executed or not.

In the judgement whether the engine control should be executed or not, the judgement is performed on the basis of the value of the first target yaw rate $\phi(\theta)$ even if the second target yaw rate $\phi(G)$ is selected as the target yaw rate in Step S13.

The reason is as follows. That is, the phase of the signal of the steering angle is advanced (or early). Therefore the behavior control may usually start at the early stage if the behavior control is executed using the first target yaw rate $\phi(\theta)$ as the control target yaw rate Trφ. In the present embodiment, by using both of the first and second target yaw rates, it is prevented that the behavior control starts at the early stage. Hereupon, even if the engine power is lowered, the driver does not often notice it in comparison with the case that the brake is controlled. Therefore disadvantages are less if the engine control is started at the early stage.

In the under-steering control, it is effective to decrease the vehicle speed at first in order to avoid the under-steering state. In consequence, the under-steering state may be effectively avoided if the engine power is lowered at the early stage so as to decrease the vehicle speed.

Because an approximately proportional relation exists between the lateral acceleration and the yaw rate, the difference between the second target yaw rate $\phi(G)$ based on the lateral acceleration and the actual yaw rate φ is small. Further, the value of the actual yaw rate φ is unstable in the under-steering state. In consequence, it may be difficult to execute the control adequately if the second target yaw rate $\phi(G)$ is used as the control target yaw rate Trφ. Due to the above-mentioned reason, the first target yaw rate $\phi(\theta)$ is used as the control target yaw rate Trφ in the judgement of the starting point of the engine control.

If the judgement in Step S17 is YES, the control is advanced to Step S18. On the other hand, if the judgement in Step S17 is NO, the control is advanced to Step S19 to judge whether the over-steering control should be started or not.

In Step S18, it is judged whether the acceleration of the yaw rate is smaller than or equal to a preset value or not. It has the aim to prevent such a matter that the control is executed in error. So it is judged whether a behavior change larger than or equal to the preset value is actually caused in the vehicle or not. If the judgement is YES, the process is advanced to Step S110. Meanwhile, if the judgement is NO, the process is advanced to Step S113 to inhibit the engine control, and then advanced to Step S19.

In Step S110, it is judged whether the vehicle is under the over-steering state (O/S) or not. This step is performed because it is probable that there is caused such a state that both of the under-steering state and the over-steering state occur at the same time, namely such a state that the vehicle moves toward the outer side of the road where the vehicle is cornering, while turning in the cornering direction. In this case, at first, it is required to avoid the over-steering state to correct the posture of the vehicle. Thus, if the judgement is YES, the process is advanced to Step S113 to inhibit the engine control in the under-steering control, and then advanced to Step S19. Meanwhile, if the judgement is NO, the control is advanced to Step S111.

In Step S111, it is judged whether the brake is in a not-operated state or not. The reason why this step is performed is as follows. That is, when the driver is operating the brake, the driving force (engine power) is not substantially generated. Therefore, even if the engine control is executed, it may be less effective. Moreover, if the engine control is executed, it may become impossible to accelerate the vehicle when the driver operates the accel after that. So it is prevented to execute such unnecessary engine control. Thus, if the judgement is YES, the process is advanced to Step S112 to calculate the control variable for restraining the engine in order to execute the engine control. Then the process is advanced to Step S114, where the signal is outputted to the engine controller 37 so as to execute the engine control, namely the engine power is decreased. Meanwhile, if the judgement in Step S111 is NO, the process is advanced to Step S113 to inhibit the engine control. After Step S113 or S114 has been completed, the process is advanced to Step S19.

In Step S19, it is judged whether the over-steering control should be started (or executed) or not. The judgement of the over-steering control is performed by judging whether the yaw rate deviation $\Delta\phi(\theta)$ or $\Delta\phi(G)$ calculated in Step S14 or S15 is larger than the threshold THOS for the over-steering control, or not. If the judgement is YES, the process is advanced to Step S115. In Step S115, in order to avoid the over-steering state, the braking degree applied to the outer front wheel, namely the front wheel lying at the outer side during the cornering motion (yaw rate), is set in accordance with the yaw rate deviation $\Delta\phi(\theta)$ or $\Delta\phi(G)$ After the braking degree has been set, the process is advanced to Step S117 to execute the braking force control. The control is executed by controlling the pressurizing motor 32, the front and rear solenoid valves 33 and 34, and the TSW and ASW solenoid valves 35 and 36. Following that, the process is advanced to Step S118, where the judgement of the completion (end) of the over-steering control is performed, and then returned.

On the other hand, if the judgement in Step S19 is NO, the process is advanced to Step S116. In Step S116, it is judged whether the under-steering control should be started (executed) or not. If the judgement is YES (to be started), the process is advanced to Step S119. Meanwhile, if the judgement is NO (not to be started), the process is returned.

In Step S119, it is judged whether the degree of the under-steering state (U/S) is small or not. If the degree is small (YES), the process is advanced to Step S120. Meanwhile, if the degree is large (NO), the process is advanced to Step S121.

In Step S120, the braking degree (or strength) of the inner front wheel is calculated. On the other hand, in Step S121, the braking degree (or strength) of the inner rear wheel is calculated. The aim of the steps is as follows. That is, when the degree of the under-steering state is small, it may be considered that each of the front wheels has sufficient grip force. Meanwhile, the braking efficiency in the case that the braking force is applied to the front wheels, is better than the efficiency in the case that the braking force is applied to the rear wheels. That is, in the former case, the speed of the vehicle can be decreased more efficiently. In consequence, when the degree of the under-steering state is small, it may be possible to execute the under-steering control surely and rapidly by braking the inner front wheel.

On the other hand, if the degree of the under-steering state is large, the braking force is applied to the inner rear wheel because it may be considered that the front wheels do not have grip force.

After the braking degree has been calculated, the process is advanced to Step S122 to execute the braking force control.

Then, in Step S123, the judgement of the completion of the under-steering control is performed. It is performed by judging whether the yaw rate deviation $\Delta\phi(\theta)$ or $\Delta\phi(G)$ is smaller than the threshold THUS. If the judgement is YES, the process is advanced to Step S124 to complete the control, and then returned. On the other hand, if the judgement is NO, the process is returned without completing the control.

(Judgement of Braking Control Start in Under-steering)

Next, the process for judging the start point of the braking control in the under-steering control in Step S116 will be described with reference to the flowchart shown in FIG. 4. In this process for judging the start point, the judgement is not performed only whether the yaw rate deviation $\Delta\phi(\theta)$ or $\Delta\phi(G)$ is larger than the threshold THUS, or not. The control is started in accordance with whether other conditions are achieved or not also, in addition to the above-mentioned condition.

Figure 4:
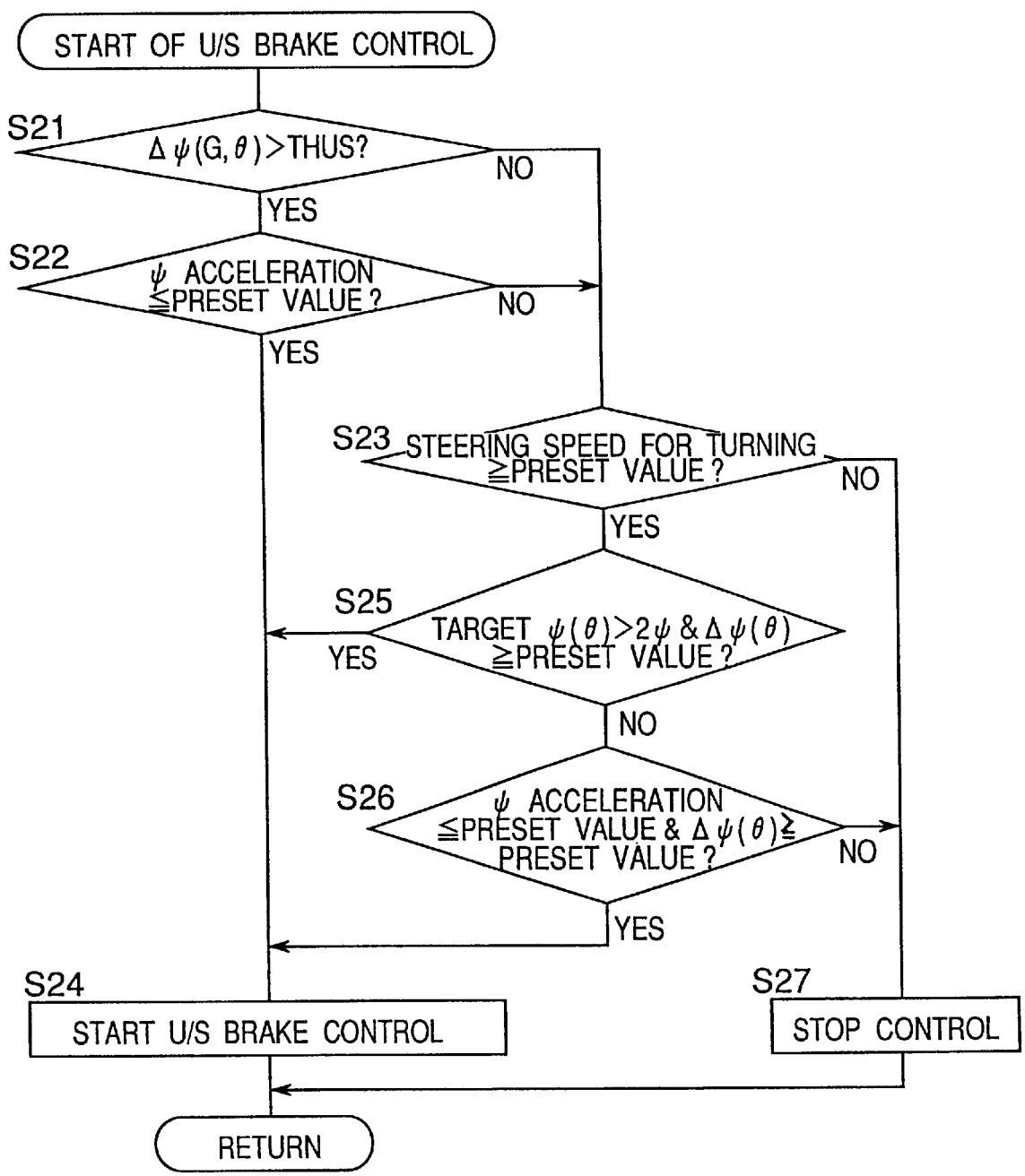
FIG. 4 is a flowchart showing a process for judging a starting point of brake control in under-steering control.

At first, in Step S21, it is judged whether the yaw rate deviation $\Delta\phi(\theta)$ or $\Delta\phi(G)$ (shown as $\Delta\phi(\theta,G)$ in FIG. 4) is larger than the threshold THUS for the under-steering control, or not. If the judgement is YES, the process is advanced to Step S22. On the other hand, the judgement is NO, the process is advanced to Step S23.

In Step S22, it is judged whether acceleration of the actual yaw rate $\phi$ is smaller than or equal to a preset value, or not. The aim of the step is to prevent that the control is executed in error, as same as the case of Step S18 (see FIG. 2).

Figure 5:
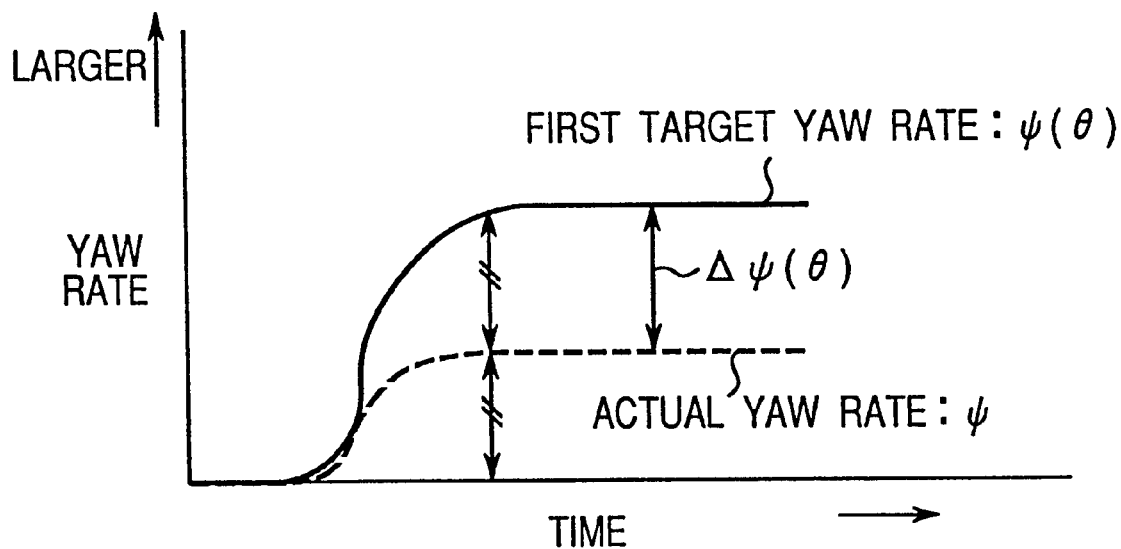
FIG. 5 is a diagram showing the relation between a first target yaw rate and an actual yaw rate, for showing the condition to start the under-steering control.
Figure 6:
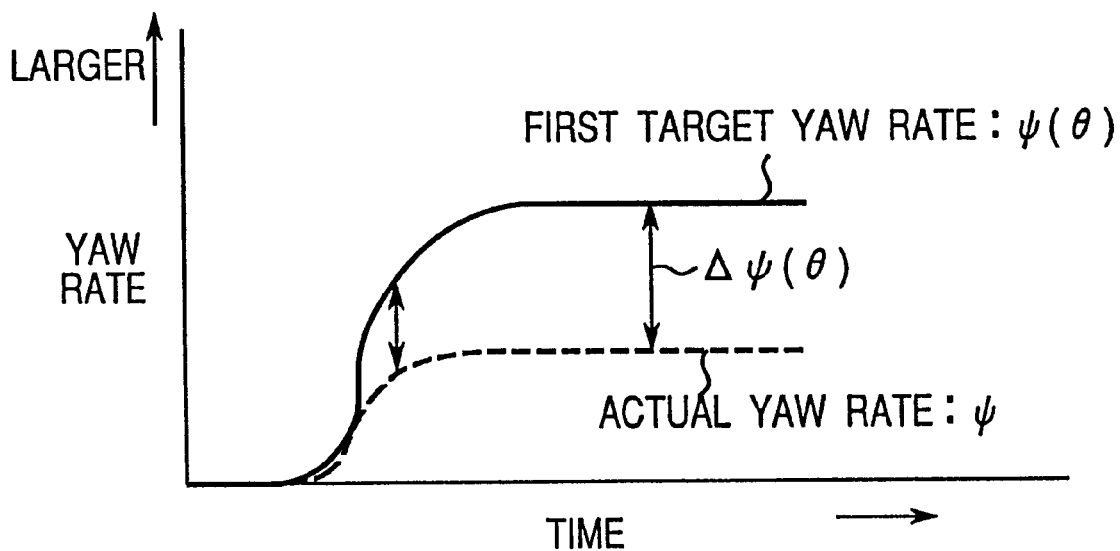
FIG. 6 is another diagram showing the relation between the first target yaw rate and the actual yaw rate, for showing the condition to start the under-steering control which is different from that of FIG. 5.

Meanwhile, in Step S23, it is judged whether the operating rate (or turning rate) of the steering wheel in the direction to increase the steering angle is larger than or equal to a preset value, or not. If the judgement is YES, the process is advanced to Step S25. On the other hand, if the judgement is NO, the process is advanced to Step S27, and then returned as the case that the control should not be executed. In Step S25; as shown in FIG. 5, it is judged whether the value of the first target yaw rate $\phi(\theta)$ is larger than twice of the value of the actual yaw rate $\phi$ or not, and further whether the value $\Delta\phi(\theta)$, which is defined as the value of $(\phi(\theta)-\phi)$, is larger than or equal to a preset value or not. If the judgement in Step S25 is NO, the process is advanced to Step S26. In Step S26, it is judged whether the acceleration of the actual yaw rate $\phi$ is smaller than or equal to a preset value or not, and further whether $\Delta\phi(\theta)$ is larger than or equal to a preset value or not. If the judgement is NO, the process is advanced to Step S27, and then returned as the case that the control should not be executed. In Step S25, it is judged whether the deviation between the first target yaw rate $\phi(\theta)$ and the actual yaw rate $\phi$ is larger or not. In Step S26, it is judged whether the expanding rate of the deviation between the first target yaw rate $\phi(\theta)$ and the actual yaw rate $\phi$ is larger (faster) or not. If the judgement in Step S25 or S26 is YES, the process is advanced to Step S24 to start the braking control under the under-steering state.

That is, if the behavior control is started in accordance with only whether the yaw rate deviation $\Delta\phi(\theta)$ or $\Delta\phi(G)$ ($\Delta\phi(\theta,G)$) is larger than the threshold THUS or not, it may be started also in such a case that the driver intentionally makes the vehicle become the under-steering state, for example in such a case of the driven under-steering state. Therefore, the behavior control is executed only in such an under-steering state that although the steering wheel is operated in the direction to increase the steering angle, the increase of the yaw rate following that is not caused so that the vehicle does not behave in accordance with the driver's will.

(Judgement of Start of Over-steering Control)

Hereinafter, the process for judging the over-steering state will be described. According to the process for judging the start point of the over-steering control, as described above, in the first and second target yaw rates $\phi(\theta)$ and $\phi(G)$, one whose absolute value is smaller than that of the other, is used as the control target yaw rate Tr$\phi$. Then the judgement is performed in accordance with whether the deviation $\Delta\phi(\theta)$ or $\Delta\phi(G)$ ($\Delta\phi(\theta,G)$) between the control target yaw rate Tr$\phi$ and the actual yaw rate $\phi$ is larger than the threshold THOS for the over-steering control.

Figure 7:
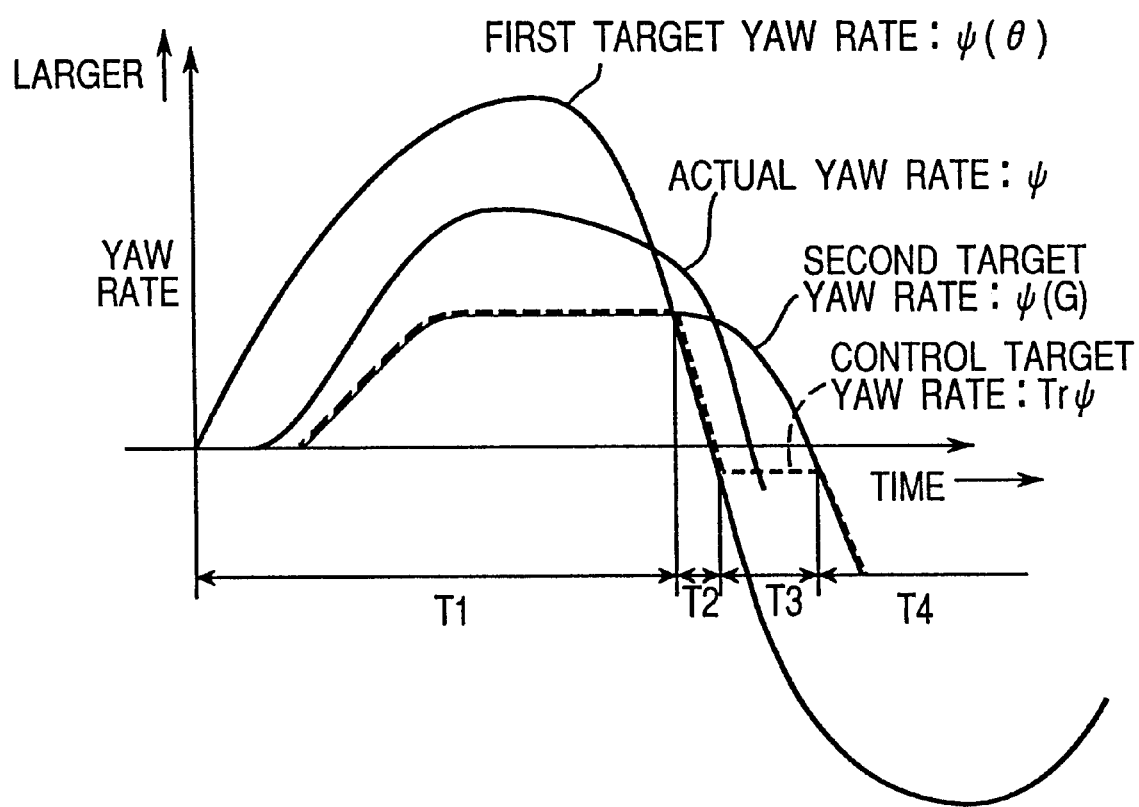
FIG. 7 is a diagram showing an example of changing characteristic of each of the first target yaw rate, the second target yaw rate, the control target yaw rate and the actual yaw rate.

For example, as shown in FIG. 7, if the absolute value of the second target yaw rate $\phi(G)$ is smaller than the absolute value of the first target yaw rate $\phi(\theta)$, the over-steering control is executed using the second target yaw rate $\phi(G)$ as the control target yaw rate Tr$\phi$ (see T1 in FIG. 7).

When the driver performs, for example, a counter-steering operation in order to avoid the above-mentioned over-steering state, it is probable that the value of the first target yaw rate $\phi(\theta)$ is smaller than the value of the second target yaw rate $\phi(G)$. In this case, the yaw rate used as the control target yaw rate Tr$\phi$ is changed from the second target yaw rate $\phi(G)$ to the first target yaw rate $\phi(\theta)$ (see T2 in FIG. 7).

When the counter-steering operation is performed as described above, the value of the actual yaw rate $\phi$ becomes smaller than the value of the second target yaw rate $\phi(G)$ in accordance with changes of the first target yaw rate $\phi(\theta)$. Hereupon, for example, if the second target yaw rate $\phi(G)$ is left to be used as the control target yaw rate Tr$\phi$, the control may be changed from the over-steering control to the under-steering control. If the under-steering control is executed as described above, the effect of the counter-steering operation is not obtained although the vehicle behavior is under the over-steering state yet and the driver performs the counter-steering operation. That is, the over-steering state may be promoted. However, if the smaller one in the first and second target yaw rates $\phi(\theta)$ and $\phi(G)$ is used as the control target yaw rate Tr$\phi$, the over-steering control is continuously executed if the counter-steering operation is performed, so that the above-mentioned disadvantage may be dissolved.

If the value of the first target yaw rate $\phi(\theta)$ has passed through the neutral point so that the value of the first target yaw rate $\phi(\theta)$ and the value of the second target yaw rate $\phi(G)$ have different signs to each other, the value of the control target yaw rate Tr$\phi$ is set to a constant preset value (see T3 in FIG. 7). After that, if the signs of the values of the first and second target yaw rates $\phi(\theta)$ and $\phi(G)$ become identical to each other, one whose absolute value is smaller (the second target yaw rate $\phi(G)$ in the case shown in FIG. 7) in the first and second target yaw rates $\phi(\theta)$ and $\phi(G)$, is used as the control target yaw rate Tr$\phi$ (see T4 in FIG. 7).

The reason why the value of the control target yaw rate Tr$\phi$ is held at the constant value as described above, is as follows. That is, it is held constant in order to avoid such a phenomenon that the control gain becomes larger in the transition state, in which the steering angle goes over the neutral point. Further, for example, if the value of the first target yaw rate $\phi(\theta)$ is continuously used as the control target yaw rate Tr$\phi$, the control variable becomes larger so that the vehicle may spin in the reverse direction. Once the vehicle has spun in the reverse direction as described above, it may be difficult to dissolve the spin of the reverse direction. Therefore, when the signs of the values of the first and second target yaw rates $\phi(\theta)$ and $\phi(G)$ are different from each other, the control target yaw rate Tr$\phi$ is held at the preset value.

Hereupon, if the preset value is set, for example, to the neutral point, the vehicle does not cause the yaw motion after that. Therefore the preset value is set to a value having an offset to the neutral point.

(Conversion Control of Counter)

As described above, on the occasion of the over-steering state, it is probable that the driver performs the counter-steering operation. In that case, also, the control for avoiding the over-steering state adequately is executed. However, if the braking control in the behavior control is executed, the behavior of the vehicle becomes larger than that of the case that the steering operation is performed by using the steering wheel. In consequence, for example, it is probable that the over-steering state in the reverse direction is caused due to delay of the turning-back operation of the steering wheel after the driver has performed the counter-steering operation. Therefore, it is probable that the yaw rate behavior of the vehicle does not converge.

Figure 8:
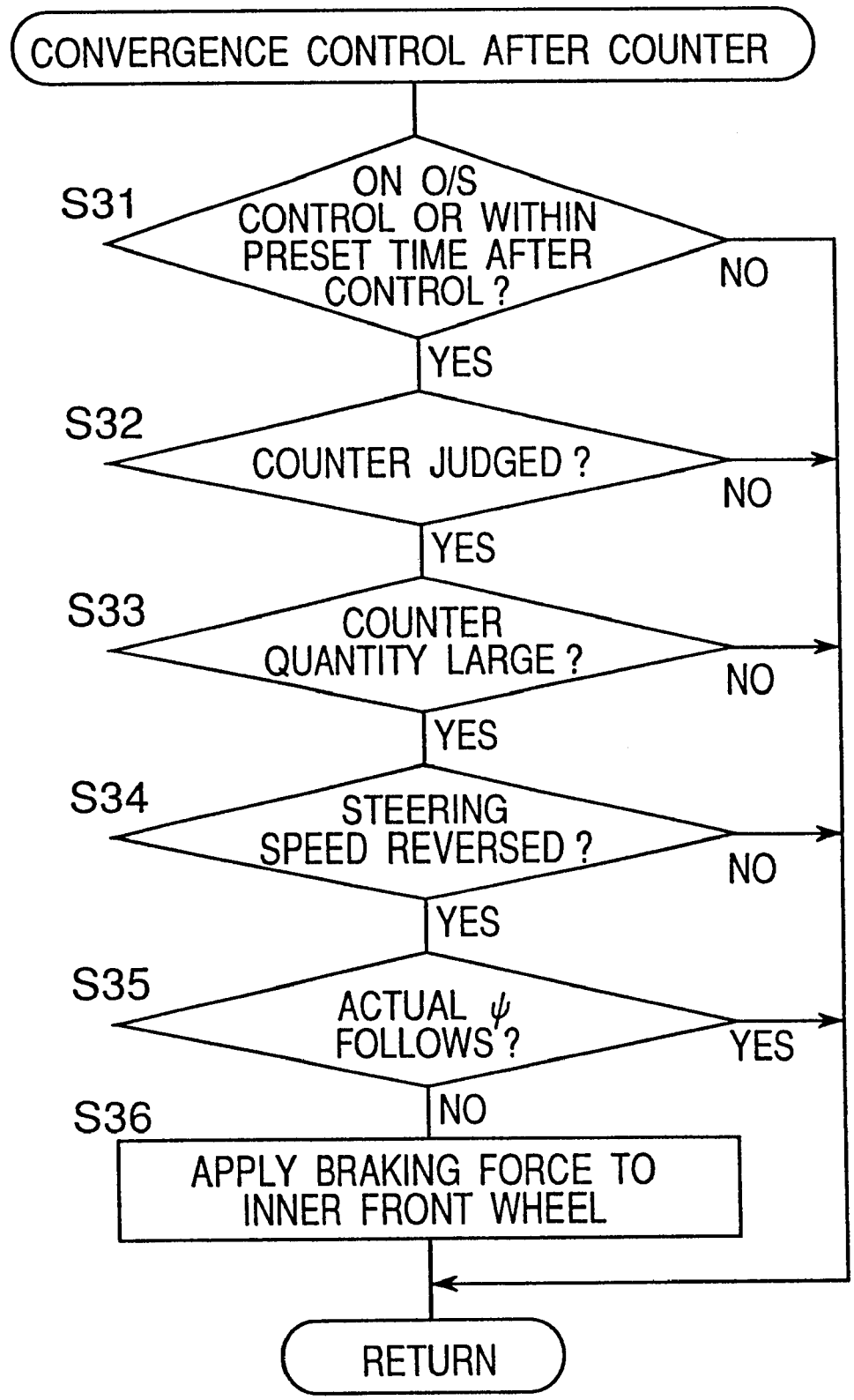
FIG. 8 is a flowchart showing a process of convergence control after a counter-steering state.

In order to prevent the over-steering state in the reverse direction, the control for applying the braking force to the inner front wheel is executed. FIG. 8 shows a flowchart of the convergence control after the counter-steering operation. In the control described above, at first, in Step S31, it is judged whether it is under the over-steering control (ON O/S) or within a preset time after the control, or not. If the judgement is YES, the process is advanced to Step S32. If the judgement is NO, the process is returned.

In Step S32, a counter judgement for judging whether the counter-steering operation is performed or not, is performed. The judgement may be performed, for example, in accordance with whether the large/small relation between the value of the actual yaw rate $\phi$ and the value of the first target yaw rate $\phi(\theta)$ based on the steering angle is reversed or not, or whether the changing rate of the steering angle is reversed or not. If the judgement is YES, the process is advanced to Step S33. Meanwhile, if the judgement is NO, the process is returned.

In Step S33, it is judged whether the degree (or quantity) of the counter is large or not. The judgement may be performed, for example, on the basis of whether the degree of the over-steering state before the counter-steering operation is large or not, or whether the changing rate of the steering angle of the steering wheel during the counter-steering operation. If the judgement is YES, the process is advanced to Step S34. Meanwhile, if the judgement is NO, the process is returned.

In Step S34, it is judged whether the changing direction of the steering angle (or speed) is reversed or not. The judgement is performed by judging whether the steering wheel is turning back after the counter-steering operation has been performed, or not. If the judgement is YES, the process is advanced to Step S35. Meanwhile, if the judgement is NO, the process is returned.

In Step S35, it is judged whether the actual yaw rate $\phi$ is following the change of the steering angle or not. If the actual yaw rate $\phi$ is following the change of the steering angle, the braking force is not applied to the inner front wheel because it may be considered that the yaw rate behavior is proceeding in such direction that it converges. Hereupon, even if the braking force has been applied, the application of the braking force may be stopped when the actual yaw rate $\phi$ follows the change of the steering angle. Thus, if the judgement is NO, the process is advanced to Step S36 to apply the braking force to the inner front wheel. Meanwhile, if the judgement is YES, the process is returned.

According to the above-mentioned control, it may be avoided that the vehicle becomes the over-steering state in the reverse direction after the counter-steering operation has been performed.

(Setting of Threshold for Under-steering Control)

Hereinafter, the process for setting the threshold THUS for the under-steering control, which is performed in Step S16 (see FIG. 2), will be described. The under-steering threshold THUS for the under-steering control is set by determining a fundamental threshold and further correcting the fundamental threshold.

Figure 9:
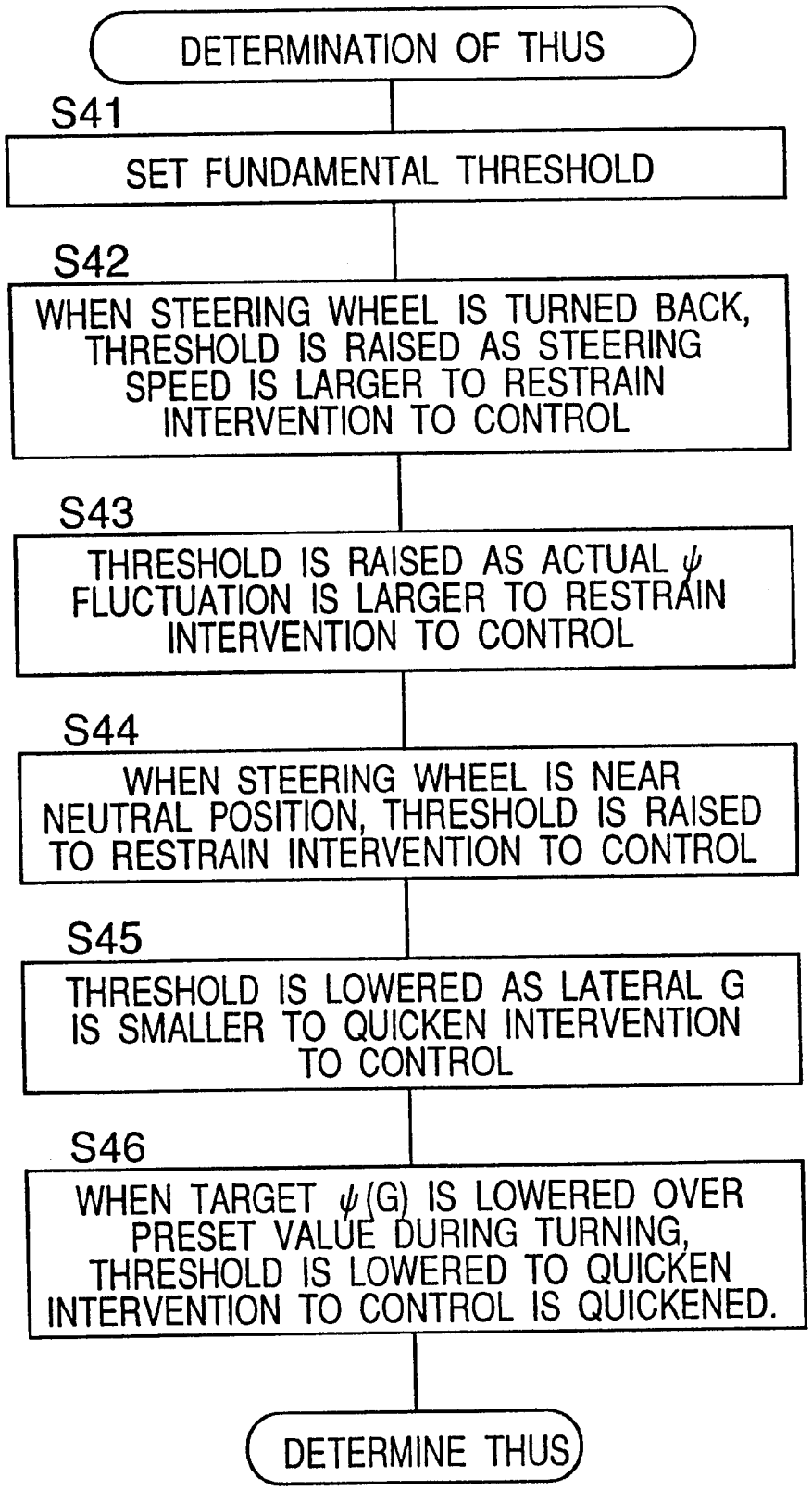
FIG. 9 is a flowchart showing a process for setting a threshold for the brake control in the under-steering control.

As shown in FIG. 9, at first, the fundamental threshold is set in Step S41. The fundamental threshold may be a predetermined constant.

Next, in Step S42, if the steering wheel is turned back, the threshold is more raised as the steering rate is larger so as to restrain executing (intervening) the behavior control. That is, it may become difficult to execute the behavior control. In this case, the steering wheel is turned back although it is under the under-steering state. Therefore it may be considered that the driver intentionally turns back the steering wheel. Thus, when the driver is intentionally driving the vehicle, execution (intervention) of the behavior control is restrained so that it is entrusted to the driver's operation. In consequence, it may be avoided that the execution of the behavior control and the driver's operation interfere to each other.

Then, in Step S43, the threshold is more raised as the fluctuation of the actual yaw rate (or change of the actual yaw rate) is larger so that the execution of the control is restrained. The reason is because the under-steering state is avoided if the yaw rate tends to increase. On the contrary, if the control is executed in the early stage on the above-mentioned case, the change of the yaw rate becomes much larger so that the over-steering state may be caused. Therefore the threshold is raised in order to avoid that the control is executed in error in the above-mentioned case.

In Step S44, the threshold is raised so that the execution of the control is restrained, if the steering wheel stands near the neutral position. The reason is as follows. That is, the under-steering state is generally caused on the occasion that the steering wheel is turned. Therefore it is not necessary to execute the under-steering control when the steering wheel stands near the neutral position. Thus it is prevented that the control is erroneously executed in the state that the under-steering state is hardly caused.

In Step S45, the threshold is more lowered as the lateral acceleration is smaller (running in the region of lower $\mu$) so that the execution of the control is quickened. It is performed in order to start the behavior control at the early stage in the above-mentioned case, because the under-steering state is easily caused when running on the region of lower $\mu$, for example, such as the snowy road or the like.

In Step S46, the threshold is lowered so that the execution of the control is quickened, if the second target yaw rate $\phi(G)$ is lowered by a preset value or more on the occasion of cornering. The aim is to quicken the execution of the control in the case that the $\mu$ of the road surface rapidly decreases so that the vehicle slips in the lateral direction, for example, such a case that the road surface is partially iced. That is, when the $\mu$ of the road surface rapidly changes, the driver cannot operate the steering wheel, or longer time may be required to operate the steering wheel. If the behavior control is executed, for example, using only the first target yaw rate $\phi(\theta)$ in the above-mentioned case, it may be impossible to start the behavior control because the first target yaw rate $\phi(\theta)$ does not change. On the other hand, according to the present embodiment, the control may be accurately executed at the early stage if the $\mu$ of the road surface changes as described above, because the behavior control is executed using the second target yaw rate $\phi(G)$ based on the lateral acceleration, too. Thus, the threshold THUS for the braking control under the under-steering state is set.

(Setting of Threshold for Over-steering Control)

Hereinafter, the process for setting the threshold THOS for the over-steering control, which is performed in Step S16 (see FIG. 2), will be described. The over-steering threshold THOS for the over-steering control is also set by determining a fundamental threshold and further correcting the fundamental threshold.

Figure 10:
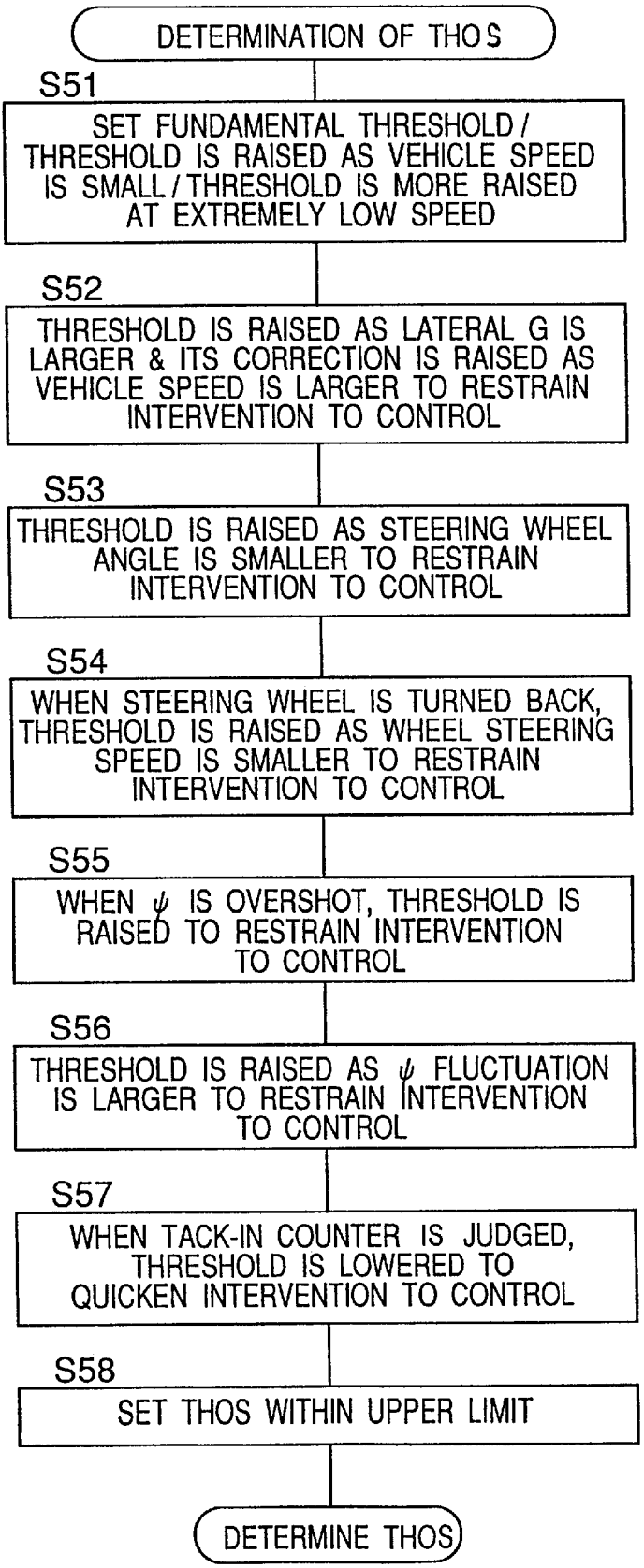
FIG. 10 is a flowchart showing a process for setting a threshold in the over-steering control.
Figure 11:
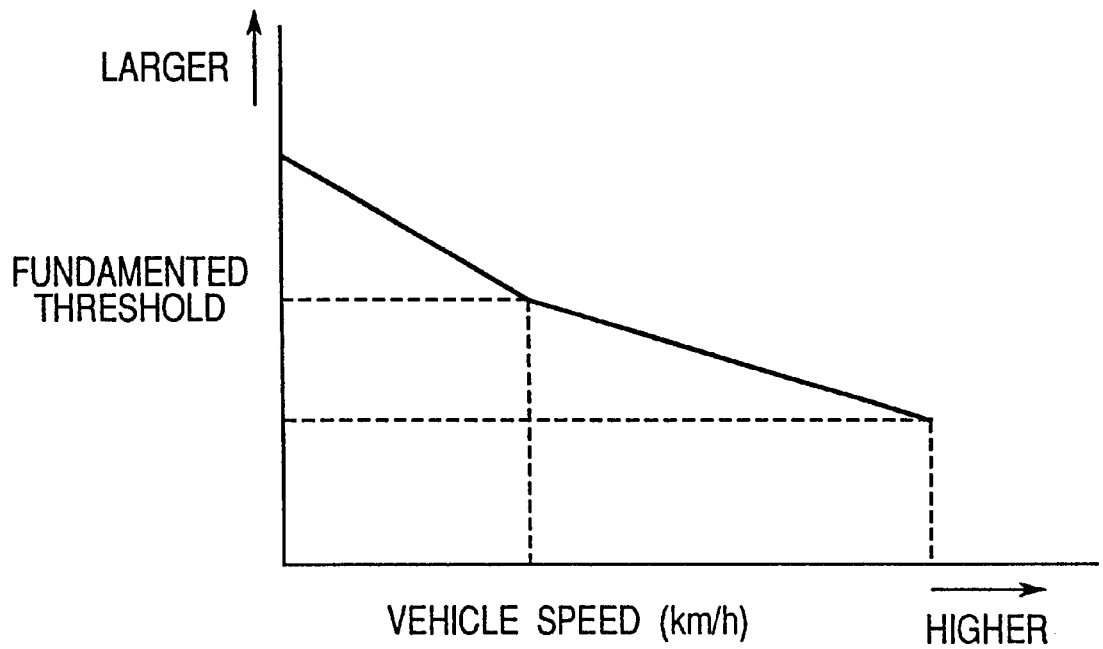
FIG. 11 is a diagram showing the relation between a fundamental threshold and vehicle speed in the over-steering control.

As shown in FIG. 10, at first, the fundamental threshold is set in Step S51. As shown in FIG. 11, the fundamental threshold is set so as to become larger as the vehicle speed V is lower. Further, in the case of extremely lower speed, the fundamental threshold is set to a much larger value.

Figure 12:
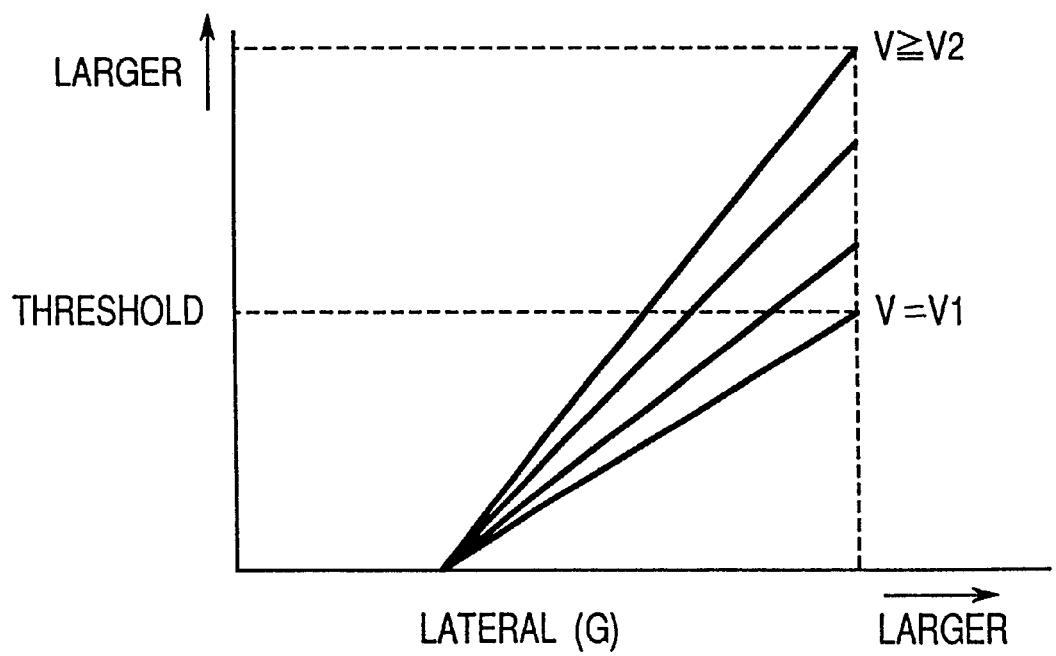
FIG. 12 is a diagram showing correction values corresponding to the lateral acceleration and the vehicle speed to the threshold in the over-steering control.

In Step S52, as shown in FIG. 12, the threshold is corrected to become larger (higher) as the lateral acceleration is larger. Further, the amount of the correction becomes larger as the vehicle speed is higher. The aim is to lower the threshold so as to execute the control at the early stage, because the over-steering state is easily caused, for example, when the lateral acceleration is lower, namely when running in the region of lower $\mu$. Another reason is that behavior control may be easily executed in error if the threshold is lower, because the behavior changes quickly when the lateral acceleration is larger (running in the region of higher $\mu$) and the vehicle speed is higher. In addition, it may be considered that a driver, who can drive the vehicle with a higher speed in the region of higher $\mu$, can sufficiently deal with the vehicle if the vehicle causes a little behavior change. Therefore, in order to prevent that the behavior control and the driver's operation interfere to each other, the threshold is raised when the lateral acceleration is larger and further the vehicle speed is higher.

In Step S53, the threshold is more raised as the steering wheel angle is smaller so that the execution of the control is restrained. The reason is because it is probable that the direction of the vehicle and the direction of the steering angle go by contraries to each other particularly on the snowy road or the like due to the disturbance of the outside, if the steering wheel angle is smaller, for example. In the above-mentioned case, the execution of the control is restrained because the vehicle naturally runs in a stable state without executing the behavior control.

In Step S54, the threshold is more raised to restrain the execution of the control as the steering rate of the steering wheel is smaller when the steering wheel is turning back. The reason is because it may be considered that the driver can sufficiently avoid the over-steering state by its own operation without executing the control, because the driver is slowly turning back the steering wheel. Therefore the threshold is raised in order to restrain the execution of the control.

Figure 13:
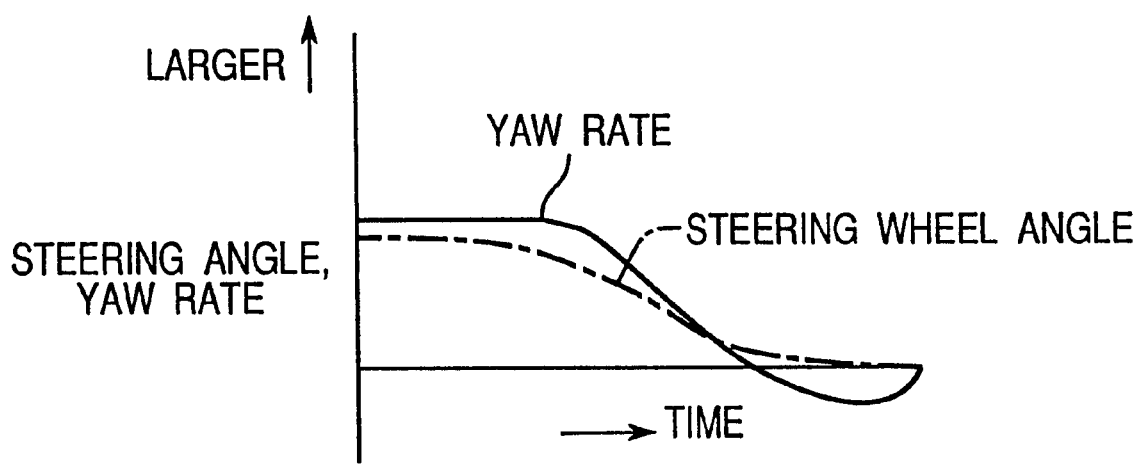
FIG. 13 is a diagram showing an over-shoot state of the actual yaw rate.

Then, in Step S55, the threshold is raised to restrain the execution of the control when the yaw rate over-shoots. As shown in FIG. 13, when the yaw rate over-shoots, it is probable that the actual yaw rate $\phi$ over-shoots nevertheless the vehicle is not in the unstable state on the occasion that the steering wheel is returned to the neutral point from the turned state. In this case, it may be judged that the vehicle is under the over-steering state. Therefore the threshold is raised in order to restrain the execution of the control.

In Step S56, the threshold is raised to restrain the execution of the control when the change of the yaw rate is larger. The aim is to prevent the erroneous execution of the control.

In Step S57, the threshold is lowered to quicken the execution of the control if it is judged that the front wheel drive vehicle is under the state of tack-in or counter-steering operation. Hereupon, it may be judged that the vehicle is under the tack-in state, for example, if the following three conditions are achieved. That is, the steering angle is constant in such a state that it is turned. Further the shift range is lower one such as the second or third range. In addition, the accel pedal is released (or returned) so that the throttle opening becomes smaller. Meanwhile, the counter-steering operation is judged on the basis of the steering wheel angle.

Then, in Step S58, the ceiling value (or upper limit) of the threshold is established, because it is probable that the threshold becomes larger to excess when the correction for raising the fundamental threshold is performed in each of the above-mentioned steps. Thus, the threshold THOS for the over-steering control is set.

(Judgement of Completion of Over-steering Control)

Figure 14:
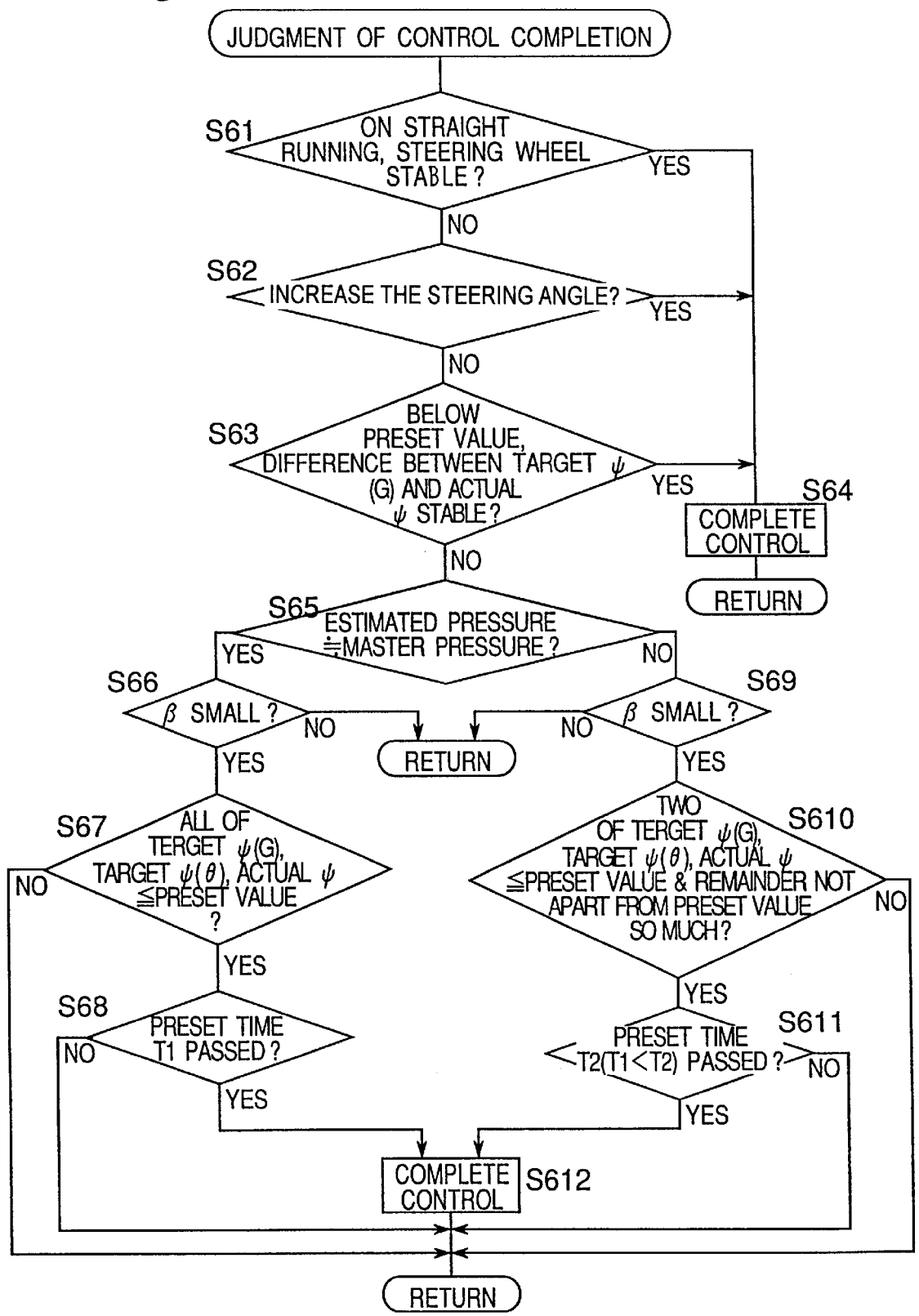
FIG. 14 is a flowchart showing a process for judging an end point of the over-steering control.

Hereinafter, the process for judging the completion of the over-steering control (see Step S118 in FIG. 2) will be described in accordance with the flowchart shown in FIG. 14. The aim of this control is to avoid the interference between the operation of the driver and the behavior control while completing the behavior control when the behavior of the vehicle is stabilized.

At first, in Step S61, it is judged whether the steering wheel is stable in such a state that the vehicle is running straight or not, namely whether the steering angle is stable at an approximately neutral position or not. If the judgement is NO, the process is advanced to Step S62.

In Step S62, it is judged whether the steering wheel is turned in the direction to increase the steering angle or not. If the judgement is NO, the process is advanced to Step S63.

In Step S63, it is judged whether the difference between the second target yaw rate $\phi(G)$ and the actual yaw rate $\phi$ is stable within the range under the preset value, or not. That is, it is judged whether the values of the both are sufficiently small and approximately identical to each other, or not. If the judgement is NO, the process is advanced to Step S65.

If the judgement in any one of Steps S61–S63 is YES, the process is advanced to Step S64 to complete the control and then returned. The reason as to the judgement in Step S61 is because it is not necessary to execute the behavior control since it may be considered that the driver is calmly operating the steering wheel. Further, it is because it is probable that the operation of the driver and the behavior control interfere to each other if the behavior control is executed. Meanwhile, the reason as to the judgement in Step S62 is because it may be considered that the driver intentionally makes the vehicle corner in the over-steering state or intentionally makes the vehicle spin so as to avoid, for example, a traffic accident, since the driver is operating the steering wheel in the direction to promote the over-steering state. In the case described above, it may be prevented that the behavior control and the operation of the driver interfere to each other, by completing the behavior control quickly. Moreover, the reason as to the judgement in Step S63 is because it is not necessary to execute the behavior control since the second target yaw rate $\phi(G)$ and the actual yaw rate $\phi$ are approximately identical to each other and stable so that the behavior of the vehicle is stable. Therefore the control is completed.

In Step S65, it is judged whether the brake fluid pressure estimated on the basis of the braking degree in the behavior control is approximately identical to the pressure in the master cylinder or not. That is, it is judged whether the present state is such that the braking force is not substantially controlled so that the behavior control may be completed. If the judgement is YES, the process is advanced to Step S66. Meanwhile, if the judgement is NO, the process is advanced to Step S69.

In Step S66, it is judged whether the slip angle $\beta$ is small or not. That is, it is judged whether the lateral slip is caused or not. If the judgement is YES, the process is advanced to Step S67. Meanwhile, if the judgement is NO, the process is returned without completing the control.

In Step S67, it is judged whether all of the value of the first target yaw rate $\phi(\theta)$, the value of the second target yaw rate $\phi(G)$ and the value of the actual yaw rate $\phi$ are smaller than or equal to a preset value or not. That is, it is judged whether the above-mentioned three values are smaller than or equal to the preset value and similar to one another. In the judgement, it is judged whether the vehicle is running approximately straight and the steering wheel is not operated or not, namely whether the behavior control is unnecessary or not. Because there may exist such a case that the condition in Step S63 can hardly achieved, the behavior control is completed on the basis of the condition which is looser than that in Step S63. If the judgement is YES, the process is advanced to Step S68 to judge whether the state meeting the above-mentioned condition has been continued for a preset time T1 or not. That is, it is judged whether the preset time T1 has passed or not because it is probable that the above-mentioned condition is accidentally achieved. If the judgement is YES, the process is advanced to Step S612 to complete the behavior control and then returned. If the judgement is NO, the process is returned without completing the control.

In Step S69, it is judged whether the slip angle $\beta$ is small or not. If the judgement is YES, the process is advanced to Step S610.

In Step S610, it is judged whether two ones in the first target yaw rate $\phi(\theta)$, the second target yaw rate $\phi(G)$ and the actual yaw rate $\phi$ are smaller than or equal to a preset value and the other one is not apart from the preset value so much, or not. This condition is looser than that in Step S67. If the judgement is YES, the process is advanced to Step S611 to judge whether the state meeting the condition in Step S610 has been continued for a preset time T2 or not. Hereupon, the preset time T2 is larger than the preset time T1 in Step S68 because the condition is looser than that in Step S67. If the judgement is YES, the control is completed and then the process is returned.

Meanwhile, if the judgement in any one of Steps S69, S610 and S611 is NO, the process is returned while continuing the control.

By continuing the control till the running state of the vehicle becomes stable as described above, it is prevented such a matter that the behavior control is completed at the early stage. The above-mentioned matter may be caused, for example, in such a case that the completion of the control is judged only on the basis of the deviation between the control target yaw rate Tr$\phi$ and the actual yaw rate $\phi$.

The above-mentioned judgement of the completion of the behavior control is available for such a case that it is necessary to execute the behavior control continuously after the behavior control has been executed once, for example, such as the case to avoid an obstruction block. Thus, by repeating the start and completion of the control within a short period, it may be prevented that the behavior changes with the completion of the behavior control or the stability of the driving operation becomes worse.

On the other hand, under the condition that the driver does not require the control, it may be prevented that the behavior control and the operation of the driver interfere to each other by completing the behavior control at the early stage.

(Brake Fluid Pressure Control)

Figure 15:
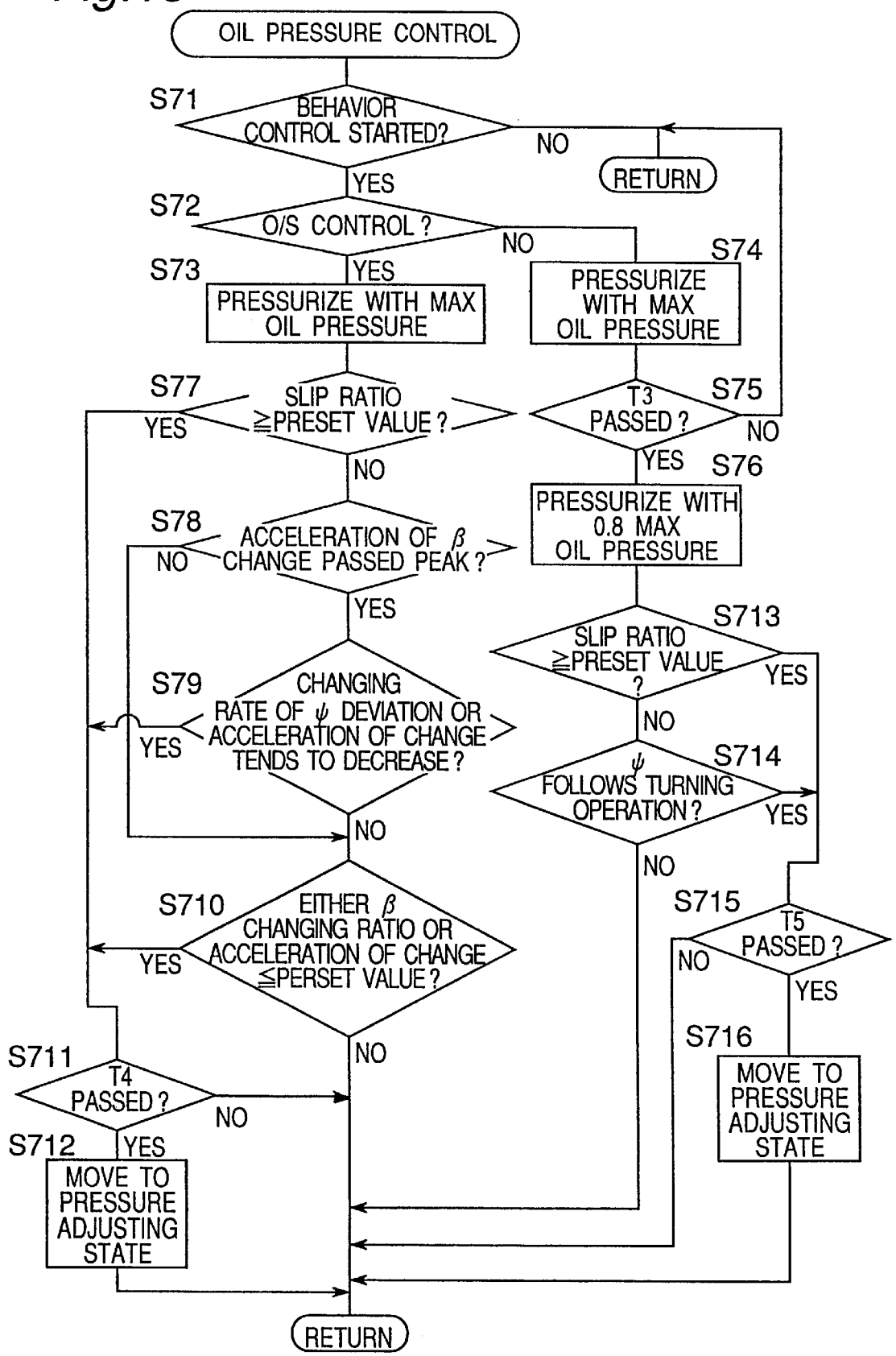
FIG. 15 is a flowchart showing a process of oil pressure control in stability control.

Hereinafter, the process for controlling the brake fluid pressure (oil pressure) in the above-mentioned behavior control will be described in accordance with the flowchart shown in FIG. 15. The brake fluid pressure control according to the present embodiment is not executed by means of feedback control of the pressure. In the control, at first, the first phase for pressurizing the brake fluid with a preset pressurizing (pressure-rising) rate is executed. Then, if the braking force is generated by the pressurized brake fluid so that the behavior of the vehicle changes, the process is advanced to the second phase (pressure-adjusting stage) for adjusting the brake fluid pressure.

At first, in Step S71, it is judged whether the behavior control has been started or not. Further, in Step S72, it is judged whether it is under the over-steering control or not. If the judgement is YES (over-steering), the process is advanced to Step S73. Meanwhile, if the judgement is NO (under-steering), the process is advanced to Step S74.

In Step S73, the brake fluid pressure is raised with a pressurizing rate of mechanical upper limit (MAX oil pressure). That is, the pressurizing pump 32 is activated with its mechanical upper limit. In addition, the ASW solenoid valve 36 and the front or rear solenoid valve 33 or 34 disposed in the fluid-feeding passage for the wheel to which the braking force is applied, are fully opened to pressurize the brake fluid.

Then, in Step S77, it is judged whether the slip ratio is larger than or equal to a preset value, or not. Hereupon, the slip ratio may be calculated on the basis of the estimated vehicle speed and the wheel speed, which are obtained from the signal detected by the wheel speed sensor 11. The judgement is performed in order to prevent occurrence of an excessively higher brake fluid pressure, because the brake fluid pressure becomes higher to excess if the brake fluid is continuously pressurized over the preset value. Thus, if the judgement is NO, the process is advanced to Step S78.

In Step S78, it is judged whether the acceleration of the change of the slip angle $\beta$ has passed its peak or not. If the judgement is YES, the process is advanced to Step S79. Meanwhile, the judgement is NO, the process is advanced to Step S710.

In Step S79, it is judged whether any one of the changing ratio (changing rate) of the yaw rate deviation $\Delta\phi(\theta,G)$ and the acceleration of the change of the yaw rate deviation $\Delta\phi(\theta,G)$ tends to decrease, namely changes in the direction to converge, or not.

In Step S710, it is judged whether any one of the changing ratio of the slip angle $\beta$ and the acceleration of the change of the slip angle $\beta$ tends to decrease, namely changes in the direction to converge or not, even if the slip angle has not passed its peak.

In Steps S78, S79 and S710, it is judged whether the behavior of the vehicle has been changed by applying the braking force while pressurizing the brake fluid or not, namely whether the effect of the behavior control has been obtained or not.

If the judgement in any one of Step S77, S79 and S710 is YES, the process is advanced to Step S711 to judge whether the time used for pressurizing the brake fluid has passed by a preset time T4 or not. The preset time T4 may be set in consideration of the threshold for starting the behavior control, the characteristics of the brake fluid pressure control system such as the pressurizing pump 32 and so on. That is, on the basis of the characteristics of the brake fluid pressure control system etc., the preset time T4 may be set to such a time that it may be considered as the minimum value for raising the brake fluid pressure till a required pressure. If the judgement is YES, the process is advanced to Step S712 to move (or enter) a pressure adjusting state (or stage) as the second phase, namely such a state that the pressure of the brake fluid is held, raised or lowered in accordance with the present condition of the vehicle. If the judgement is NO, the process is returned to continue raising the pressure of the brake fluid.

On the other hand, if the process is advanced to Step S74 as the case of the under-steering control, at first the pressure of the brake fluid is raised with the pressurizing rate of a mechanically maximum limit in Step S74. Then the process is advanced to Step S75 to judge whether the time used for pressurizing the brake fluid has passed by a preset time T3 or not. If the judgement is YES, the process is advanced to Step S76. Meanwhile, if the judgement is NO, it is continued to raise the pressure of the brake fluid with the pressurizing rate of the mechanically maximum limit, till the time used for pressurizing the brake fluid reaches the preset time T3. In Step S76, for example, the pressure of the brake fluid is raised with the pressurizing rate of the value of 0.8 times of the mechanically maximum limit.

The aim is to avoid lock-ing of wheels, which may be caused because of lack of the grip force of the tires under the under-steering state. That is, at first, delay of the rise of the pressure of the brake fluid, for example, which cause a time lag of the behavior control when the brake pad is pressed to the disk rotor, is recovered by raising the pressure of the brake fluid with the pressurizing rate of the mechanically maximum limit. Then it is continued to pressurize the brake fluid while lowering the pressurizing rate a little. In consequence, it is prevented that the pressure of the brake fluid is raised to excess so that the wheels are locked.

Then, in Step S713, it is judged whether the slip ratio is larger than or equal to a preset value or not. If the judgement is NO, the process is advanced to Step S714 to judge whether the actual yaw rate $\phi$ changes to follow the turning operation of the steering wheel, or not. If the judgement is NO, the process is returned to continue pressurizing the brake fluid because the effect of the behavior control has not appeared yet.

On the other hand, the judgement in Step S713 or S714 is YES, the process is advanced to Step S715 to judge whether the time used for pressurizing the brake fluid has passed by a preset time T5 or not. If the judgement is YES, the process is advanced to Step S716 to move the pressure adjusting state. If the judgement is NO, the process is returned to continue raising the pressure of the brake fluid.

By executing the control of the brake fluid pressure without using feedback control as described above, the control system of the brake fluid pressure may be simply constructed.

Further, because the pressure of the brake fluid is raised with the pressurizing rate of the mechanically maximum limit or the pressurizing rate lower than the mechanically maximum limit (the first phase), the braking force may be applied at the earlier stage so that the behavior control may be rapidly achieved. In addition, if the behavior of the vehicle proceeds in the direction to converge, the process moves to the pressure adjusting control (the second phase) so that the behavior control may be accurately achieved without increasing the control variable to excess.

In particular, if the execution of the behavior control is delayed as much as possible as the case of the present embodiment, the driver or the like may hardly feel a malaise when the above-mentioned control of the brake fluid pressure is executed. Further, because the behavior control can be rapidly executed, the control of the brake fluid pressure may become extremely effective.

(Control of Alarm)

Hereinafter, the process for controlling the alarm 38 will be described in accordance with the flowchart shown in FIG. 16. The operation of the alarm 38 is started later than the start of the behavior control, and is completed later than the completion of the behavior control.

At first, in Step S81, it is judged whether the flag F is 1 or not. As described later, the flag F is set to 1 when the stability control of the vehicle is being executed. If the judgement is YES, the process is advanced to Step S87. Meanwhile, if the judgement is NO, the process is advanced to Step S82 to execute the control for starting the operation of the alarm 38.

In Step S82, it is judged whether the behavior control is executed or not. If the judgement is YES, the process is advanced to Step S83. Meanwhile, if the judgement is NO, the process is returned.

In Step S83, it is judged whether the estimated brake fluid pressure is higher than or equal to a preset value, or not. If the judgement is YES, the process is advanced to Step S84. Meanwhile, if the judgement is NO, the process is advanced to Step S85.

In Step S85, it is judged whether a preset time has passed from the starting point of the behavior control or not. If the judgement is YES, the process is advanced to Step S84. Meanwhile, if the judgement is NO, the process is returned.

In Step S8φthe flag F is set to 1. Then the process is advanced to Step S86 to activate the alarm 38 (alarm ON), and then returned.

As described above, the start of the operation of the alarm 38 is delayed in comparison with the start of the behavior control, for example, till the estimated brake fluid pressure becomes higher than or equal to the preset value, or till the operated time of the behavior controller becomes longer than or equal to the preset time. In consequence, it may be prevented that the driver feels such a malaise that the driver is alarmed although he/she does not notice the behavior control. Further, it may be prevented that the driver makes an operation mistake due to the malaise.

Hereupon, the above-mentioned Steps S82–S86 relate to the control for starting the operation of the alarm 38. Meanwhile, the process performed when the judgement in Step S81 is YES, relates to the control for completing the operation of the alarm 38.

That is, in Step S87, it is judged whether the vehicle is running straight under a stable state or not. If the judgement is NO, the process is advanced to Step S88. In step S88, it is judged whether a preset time has passed from the completion of the behavior control or not. If the judgement is NO, the process is advanced to Step S89.

In Step S89, the brake fluid pressure (braking pressure) is approximately identical to the pressure of the master cylinder or not. That is, for example, when the driver is not operating the brake pedal, it is judged whether the brake fluid pressure is identical to the atmospheric pressure or not. Meanwhile, when the driver is operating the brake pedal, it is judged whether the brake fluid pressure is identical to the pressure of the master cylinder, which corresponds to the degree of the operation of the brake pedal, or not. If the judgement is NO, the process is returned.

If the judgement in any one of Steps S87, S88 and S89 is YES, the process is advanced to Step S810 to set the flag F to 0. Then the process is advanced to Step S811 to complete the operation of the alarm 38, and then returned.

Because the operation of the alarm 38 is completed after the preset time has passed from the completion of the behavior control as described above, the start and completion of the alarm 38 may not be repeated so that the operation is successively performed, for example, when the behavior control such as an action to avoid an obstruction is intermittently executed. In consequence, it may be prevented that the driver feels a malaise.

Moreover, by continuing the operation of the alarm 38 till the running environment of the vehicle changes after the completion of the behavior control for stabilizing the vehicle under the straight-running state, or for making the brake fluid pressure identical to the pressure of the master cylinder approximately, it may be prevented that the start and completion of the alarm are repeated. In consequence, the alarm may become such adequate not so as to give a malaise to the driver.

(Other Embodiments)

The present invention is not limited to the above-mentioned embodiment, but may include other various embodiments. That is, in the above-mentioned embodiment, on the occasion that the threshold THUS for the under-steering control is set (see FIG. 9), the threshold is lowered when the second target yaw rate $\phi(G)$ becomes lower than the preset value during the cornering motion (see Step S46 in FIG. 9). However, in the case that the above-mentioned condition is achieved, the brake control itself of the under-steering control may be forcibly executed to start the control, without correcting the threshold THUS.

Meanwhile, in the above-mentioned embodiment, on the occasion that the threshold THOS for the over-steering control is set (see FIG. 10), the threshold is lowered in the case of the tack-in state (see Step S57 in FIG. 10). However, in the case of the tack-in state, the over-steering control itself may be forcibly executed to start the control. That is, in Step S19 in FIG. 2, it may judged whether the yaw rate deviation $\Delta\phi(\theta,G)$ goes over the threshold or it is in the tack-in state.

Further, in the above-mentioned embodiment, the threshold THOS is lowered in the case of the counter-steering state (see Step S57 in FIG. 10). However, in the case of the counter-steering state, the over-steering control itself may be forcibly executed to start the control, as same as the case of the tack-in state.

In addition, according to the above-mentioned embodiment, when the first target yaw rate $\phi(\theta)$ is smaller than the second target yaw rate $\phi(G)$, that is, such a case that the driver performs the counter-steering operation under the over-steering state (see FIG. 7), the control target yaw rate Tr$\phi$ is changed from the second target yaw rate $\phi(G)$ to the first target yaw rate $\phi(\theta)$ at the time point that the first target yaw rate $\phi(\theta)$ has become smaller than the second target yaw rate $\phi(G)$ However, instead of the above-mentioned control, for example, the following control may be executed.

That is, when the control target yaw rate Tr$\phi$ is changed from the second target yaw rate $\phi(G)$ to the first target yaw rate $\phi(\theta)$, it is probable that the braking pressure or the like rapidly changes. In consequence, if it is estimated, on the basis of the inversion of the steering angle or the like, that the absolute value of the first target yaw rate $\phi(\theta)$ may become smaller than the absolute value of the second target yaw rate $\phi(G)$, the control variable may be relieved not so as to change the control target yaw rate Tr$\phi$ rapidly. That is, there is provided a relief means for relieving the controlling action when the control target yaw rate Tr$\phi$ is changed from the second target yaw rate $\phi(G)$ to the first target yaw rate $\phi(\theta)$ For example, the relief means functions as follows. That is, the relief means previously sets an upper limit value of the brake fluid pressure. Thus, the relief means prevents that the brake fluid pressure higher than or equal to the upper limit value is caused, even if the control target yaw rate Tr$\phi$ is changed from the second target yaw rate $\phi(G)$ to the first target yaw rate $\phi(\theta)$. Alternatively, the relief means sets the control target yaw rate Tr$\phi$ by correcting it in such a manner as to add the value of the first order differential of the first target yaw rate $\phi(\theta)$ to the second target yaw rate $\phi(G)$, if it is estimated that the first target yaw rate $\phi(\theta)$ may become smaller than the second target yaw rate $\phi(G)$. In this case, the control action is relieved when the control target yaw rate Tr$\phi$ is changed, thereby the shock due to the change may be reduced.

Moreover, according to the above-mentioned embodiment, among the values of the first and second target yaw rates $\phi(\theta)$ and $\phi(G)$, one whose absolute value is smaller than that of the other, is used as the control target yaw rate Tr$\phi$. However, in the case that the fluctuation of the yaw rate is extremely large, for example in the case that the vehicle is running on a bad road, the first target yaw rate $\phi(\theta)$ is used as the control target yaw rate Tr$\phi$ even if the absolute value of the second target yaw rate $\phi(G)$ is smaller than the absolute value of the first target yaw rate $\phi(\theta)$. That is, if the fluctuation of the yaw rate is extremely large, it is probable that the fluctuation of the lateral acceleration becomes larger so that the value of the second target yaw rate $\phi(G)$ becomes inadequate as the value of the control target yaw rate Tr$\phi$. Therefore, the stable first target yaw rate $\phi(\theta)$ based on the steering angle may be used as the control target yaw rate Tr$\phi$.

Meanwhile, if the fluctuation of the yaw rate is extremely large, the following expression (4) may used as the expression for correcting the control target yaw rate Tr$\phi$, instead of the above-mentioned expression (3)

$$Tr\phi=(1-k2)\times\phi(G)+k2\times\phi(\theta) \qquad (4)$$

That is, the value (yaw rate) obtained by adding the correction value corresponding to the difference between the first and second target yaw rates $\phi(\theta)$ and $\phi(G)$ to the second target yaw rate $\phi(G)$ is used as the control target yaw rate Tr$\phi$. In this case, if k2 is set to a larger value, the ratio of the correction of the first target yaw rate $\phi(\theta)$ becomes larger. In consequence, if the fluctuation of the yaw rate is extremely large, the behavior control may be adequately executed.

Figure 16:
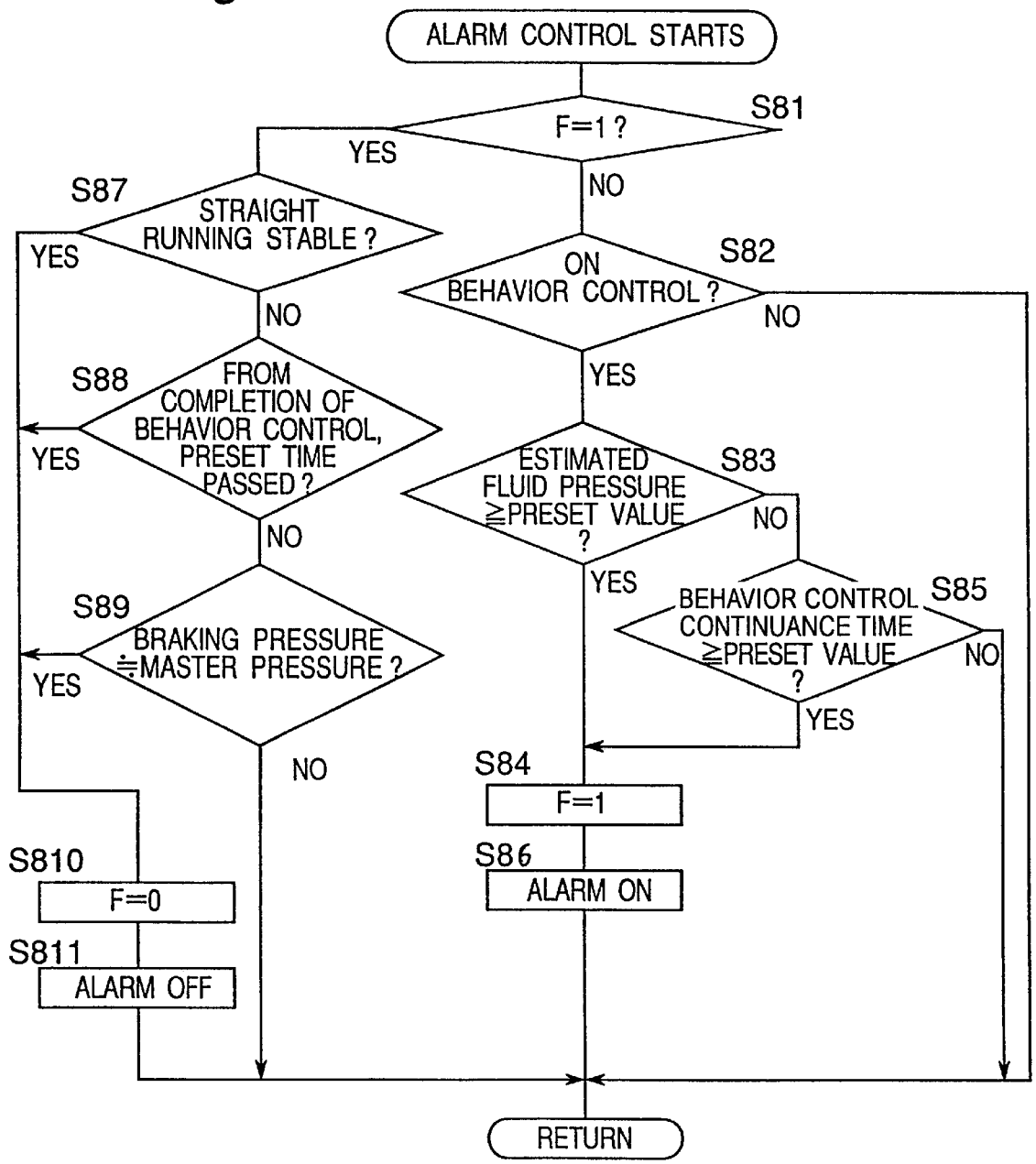
FIG. 16 is a flowchart showing a process of alarm control.

In addition, in the above-mentioned embodiment, the condition for starting the operation of the alarm 38 is such that the estimated brake fluid pressure becomes larger than or equal to the preset value (see Step S83 in FIG. 16). However, in addition to the above-mentioned condition, there may be added, for example, such a condition that the alarm 38 is activated if the decrease of the engine power becomes larger than or equal to a preset value.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for controlling behavior of a vehicle, which judges whether said vehicle is in an under-steering state on the basis of a deviation between a target yaw rate and an actual yaw rate and executes under-steering control for restraining the under-steering state, said apparatus comprising, a controller which controls behavior of a yaw rate of said vehicle by estimating a running state of said vehicle to control a brake on the basis of estimated results, wherein said controller executes the under-steering control when a steering wheel is operated in a direction to increase a steering angle and the actual yaw rate does not increase in such a condition that said vehicle is in the under-steering state.

2. The apparatus according to claim 1, wherein said controller executes the under-steering control when a target yaw rate, which is set on the basis of lateral acceleration and speed of said vehicle, lowers by a preset value or more on an occasion that said vehicle is cornering.

3. An apparatus for controlling behavior of a vehicle, said apparatus comprising, which judges whether said vehicle is in an under-steering state on the basis of a deviation between a target yaw rate and an actual yaw rate and executes under-steering control for restraining the under-steering state, said apparatus comprising, a controller which sets the target yaw rate on the basis of lateral acceleration and speed of said vehicle, and makes the actual yaw rate follow the target yaw rate, wherein said controller quickens executing the under-steering control of said vehicle than usual by lowering a threshold for executing the under-steering control if the target yaw rate lowers by a preset value or more on an occasion that said vehicle is cornering.

4. An apparatus for controlling behavior of a vehicle having driven front wheels, which judges whether said vehicle is in an over-steering state on the basis of a deviation between a target yaw rate and an actual yaw rate and executes over-steering control for restraining the over-steering state by controlling a brake, said apparatus comprising, a controller which sets the target yaw rate by using at least speed of said vehicle, and makes the actual yaw rate follow the target yaw rate, wherein said controller quickens executing the over-steering control of said vehicle than usual if said vehicle is judged to be in a tack-in state.

5. The apparatus according to claim 4, wherein said controller quickens executing the over-steering control by lowering a threshold for executing the over-steering control.

6. The apparatus according to claim 4, wherein said controller quickens executing the over-steering control by executing the over-steering control by force.

7. An apparatus for controlling behavior of a vehicle, which judges whether said vehicle is in an over-steering state on the basis of a deviation between a target yaw rate and an actual yaw rate and executes over-steering control for restraining the over-steering state by controlling a brake, said apparatus comprising, a controller which sets the target yaw rate by using at least speed of said vehicle, and makes the actual yaw rate follow the target yaw rate, wherein said controller quickens executing the over-steering control of said vehicle than usual if said vehicle is judged to be in a counter-steering state.

8. The apparatus according to claim 7, wherein said controller quickens executing the over-steering control by lowering a threshold for executing the over-steering control.

9. The apparatus according to claim 7, wherein said controller quickens executing the over-steering control by executing the over-steering control by force.

10. The apparatus according to claim 7, wherein said controller sets the target yaw rate on the basis of lateral acceleration and speed of said vehicle, and judges the counter-steering state on the basis of a steering angle of said vehicle.

* * * * *